US009581508B2

(12) United States Patent
Tetsuka et al.

(10) Patent No.: US 9,581,508 B2
(45) Date of Patent: Feb. 28, 2017

(54) BICYCLE PEDALING FORCE DETECTOR

(71) Applicant: Shimano Inc., Sakai, Osaka (JP)

(72) Inventors: Toshio Tetsuka, Osaka (JP); Fumiaki Yoshida, Osaka (JP); Shintarou Mori, Osaka (JP)

(73) Assignee: Shimano Inc., Osaka (JP)

( * ) Notice: Subject to any disclaimer, the term of this patent is extended or adjusted under 35 U.S.C. 154(b) by 63 days.

(21) Appl. No.: 14/603,729

(22) Filed: Jan. 23, 2015

(65) Prior Publication Data
US 2016/0216169 A1 Jul. 28, 2016

(51) Int. Cl.
*G01L 1/22* (2006.01)
*G01L 5/16* (2006.01)
*B62M 3/00* (2006.01)

(52) U.S. Cl.
CPC .............. *G01L 5/161* (2013.01); *B62M 3/00* (2013.01); *B62K 2207/00* (2013.01)

(58) Field of Classification Search
CPC ....... G01L 5/161; B62M 3/00; B62K 2207/00
USPC .............................................. 73/760, 862.045
See application file for complete search history.

(56) References Cited

U.S. PATENT DOCUMENTS

| 7,253,610 | B2 * | 8/2007 | Nagae ................... G08C 17/00 324/167 |
| 7,516,677 | B2 | 4/2009 | Watarai et al. |
| 8,505,393 | B2 | 8/2013 | Meyer |
| 2010/0263468 | A1 * | 10/2010 | Fisher ..................... G01L 5/225 74/469 |
| 2010/0282001 | A1 | 11/2010 | Sasaki |
| 2011/0041626 | A1 * | 2/2011 | Tuulari ................. G01L 1/2237 73/862.627 |
| 2012/0214646 | A1 * | 8/2012 | Lull ....................... G01L 3/242 482/5 |
| 2012/0330572 | A1 | 12/2012 | Longman |
| 2013/0019700 | A1 | 1/2013 | Matsumoto |
| 2013/0024137 | A1 * | 1/2013 | Grassi ..................... G01L 3/108 702/43 |
| 2013/0104650 | A1 | 5/2013 | Bailey et al. |
| 2013/0205916 | A1 | 8/2013 | Kodama et al. |
| 2013/0210583 | A1 | 8/2013 | Kametani et al. |
| 2013/0233126 | A1 * | 9/2013 | Tetsuka ................... B62M 3/00 74/594.1 |
| 2014/0060212 | A1 | 3/2014 | Tetsuka et al. |

FOREIGN PATENT DOCUMENTS

WO 2012/056510 A1 5/2012

* cited by examiner

*Primary Examiner* — Max Noori
(74) *Attorney, Agent, or Firm* — Global IP Counselors

(57) ABSTRACT

A bicycle pedaling force detector is basically provided with that basically includes a first sensor circuit, a wireless communicator and a first electrical connection member. The first sensor circuit is coupled to a first housing that is configured to be mounted to a crank assembly. The wireless communicator is coupled to a second housing that is configured to be detachably mounted to a crank assembly. The second housing is a separate member from the first housing. The first electrical connection member is configured to electrically connect the wireless communicator and the first sensor circuit.

21 Claims, 18 Drawing Sheets

BICYCLE PEDALING FORCE DETECTOR

BACKGROUND

Field of the Invention

This invention generally relates to a bicycle pedaling force detector. More specifically, the present invention relates to a bicycle pedaling force detector having a wireless communicator is configured to be detachably connected to a crank assembly, and housed separately from a sensor circuit mounted to the crank assembly.

Background Information

Bicycles are sometimes equipped with various sensors for providing information to the rider and/or for providing information to a controller to control various aspects of the bicycle such as shifting or suspension stiffness. One such sensor is a torque or force sensor for detecting a pedaling force of the rider. Various sensing arrangements have been proposed for detecting a pedaling force of the rider. For example, in U.S. Pat. No. 7,516,677 (assigned to Shimano Inc.), a cylindrical torsion-detecting sleeve member (force sensor unit) is provided on a crank axle for detecting a pedaling force applied to the crank axle during pedaling.

Pedaling force detectors typically use strain gauges to measure pedaling force during pedaling. For example, a force sensor is disclosed in U.S. Patent Application Publication No. 2010/0282001 (assigned to Shimano Inc.), which utilizes a strain gauge for detecting a pedaling force applied to a crankshaft during pedaling. Recently, pedaling force detectors have incorporated wireless communication technology. For example, a pedaling force sensor is disclosed in U.S. Patent Application Publication No. 2012/0214646, which describes a power measurement device including processing circuitry within a housing. The processing circuitry is coupled with strain gauges mounted on the crank arm, and produces a power value that is wirelessly transmitted to a separate display that may receive and display power measurements. Some pedaling force detectors are arranged such that portions are disposed on a sensor board removable from a crank assembly, as disclosed in U.S. Patent Application Publication No. 2014/0060212 (assigned to Shimano).

SUMMARY

Generally, the present disclosure is directed to various features of a bicycle pedaling force detector that detects a pedaling force being applied on the bicycle crank arm.

In view of the state of the known technology and in accordance with a first aspect of the present disclosure, a bicycle pedaling force detector is provided that basically comprises a first sensor circuit, a wireless communicator and a first electrical connection member. The first sensor circuit is disposed in a first housing that is configured to be mounted to a crank assembly. The wireless communicator is disposed in a second housing that is configured to be detachably mounted to a crank assembly. The second housing is a separate member from the first housing. The first electrical connection member is configured to electrically connect the wireless communicator and the first sensor circuit.

In accordance with a second aspect of the present invention, the bicycle pedaling force detector according to the first aspect is configured so that the crank assembly includes a first crank arm.

In accordance with a third aspect of the present invention, the bicycle pedaling force detector according to the second aspect is configured so that the first sensor circuit is configured to be mounted to the first crank arm.

In accordance with a fourth aspect of the present invention, the bicycle pedaling force detector according to the second aspect is configured so that the wireless communicator is configured to be detachably mounted to the first crank arm.

In accordance with a fifth aspect of the present invention, the bicycle pedaling force detector according to the second aspect is configured so that the first sensor circuit is configured to be mounted outside of the first crank arm.

In accordance with a sixth aspect of the present invention, the bicycle pedaling force detector according to the second aspect is configured so that the first sensor circuit is configured to be mounted inside of the first crank arm.

In accordance with a seventh aspect of the present invention, the bicycle pedaling force detector according to the second aspect further comprises a plurality of strain sensors. The strain sensors are fixed to the first crank arm, and are electrically connected to the first sensor circuit.

In accordance with an eighth aspect of the present invention, the bicycle pedaling force detector according to the second aspect is configured so that the first crank arm includes a fixing structure, and the second housing is configured to be detachably attached to the fixing structure.

In accordance with a ninth aspect of the present invention, the bicycle pedaling force detector according to the second aspect further comprises a plurality of strain sensors. The strain sensors are fixed to an exterior of the first crank arm, and are electrically connected to the first sensor circuit.

In accordance with a tenth aspect of the present invention, the bicycle pedaling force detector according to the second aspect further comprises a plurality of strain sensors fixed to an interior of the first crank arm, and the strain sensors are electrically connected to the first sensor circuit.

In accordance with an eleventh aspect of the present invention, the bicycle pedaling force detector according to the second aspect is configured so that the first electrical connection member includes an electrical wire, and the first crank arm includes a first hole. The electrical wire is at least partially disposed in the first hole.

In accordance with a twelfth aspect of the present invention, the bicycle pedaling force detector according to the eleventh aspect is configured so that the first electrical connection member further includes a first connector and a second connector. The first connector is mounted on the first crank arm. The second connector is mounted on the wireless communicator. The second connector is detachably connected to the first connector when the wireless communicator is detachably mounted to the first crank arm.

In accordance with a thirteenth aspect of the present invention, the bicycle pedaling force detector according to the second aspect is configured so that the pedaling force detector further has a second sensor circuit and a second electrical connection member. The crank assembly further includes a second crank arm, and a crankshaft connected to the first crank arm and the second crank arm. The second sensor circuit is fixed to the second crank arm. The second electrical connection member extends through the crankshaft, and electrically connects the wireless communicator and the second sensor circuit.

In accordance with a fourteenth aspect of the present invention, the bicycle pedaling force detector according to the first aspect is configured so that the first sensor circuit includes an amplifier circuit and a calculation circuit.

In accordance with a fifteenth aspect of the present invention, the bicycle pedaling force detector according to the first aspect is configured so that the first sensor circuit is configured to be permanently mounted to the crank assembly.

In accordance with a sixteenth aspect of the present invention, the bicycle pedaling force detector according to the first aspect is configured so that the second housing further includes a battery receiving structure.

In accordance with a seventeenth aspect of the present invention, the bicycle pedaling force detector according to the first aspect further comprises a cadence sensor attached to one of the first housing and the second housing.

In accordance with an eighteenth aspect of the present invention, the bicycle pedaling force detector according to the seventeenth aspect is configured so that the cadence sensor is mounted to the first housing.

In accordance with a nineteenth aspect of the present invention, the bicycle pedaling force detector according to the seventeenth aspect is configured so that the cadence sensor is mounted to the second housing.

Also other objects, features, aspects and advantages of the disclosed bicycle pedaling force detector will become apparent to those skilled in the art from the following detailed description, which, taken in conjunction with the annexed drawings, discloses selected embodiments of the bicycle pedaling force detector.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
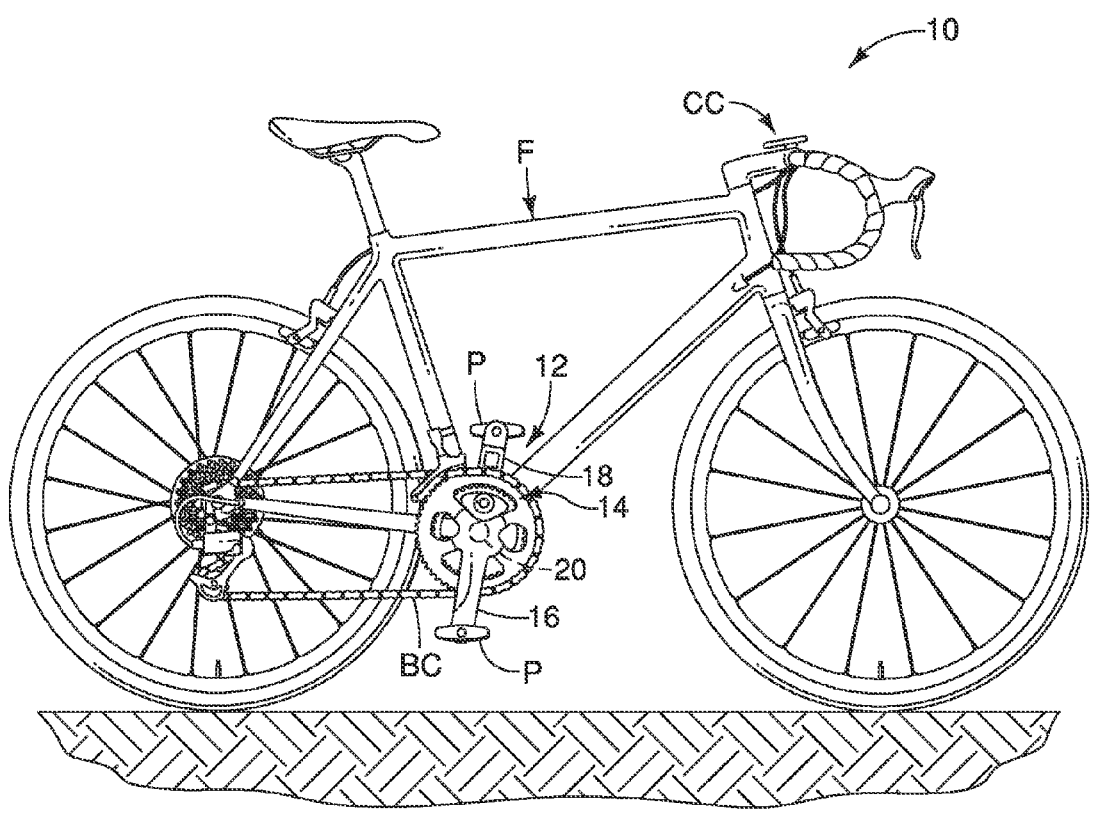
FIG. 1 is a side elevational view of a bicycle that is equipped with a bicycle crank assembly having a pedaling force detector in accordance with a first illustrated embodiment.

Referring initially to FIG. 1, a bicycle 10 is illustrated that is equipped that includes a bicycle crank assembly 12 having a pedaling force detector 14 in accordance with a first embodiment. The bicycle crank assembly 12 is rotatably mounted to a bicycle frame F of the bicycle 10 in a conventional manner. Basically, the pedaling force detector 14 detects a pedaling force applied to the bicycle crank assembly 12 by a rider, and then provides pedaling force information to the rider. Here, in the first embodiment, the pedaling force information is wirelessly outputted by the pedaling force detector 14 to a wireless cycle computer CC. Here, the bicycle 10 is a road style bicycle that includes various electrically-controlled components. Of course, it will be apparent to those skilled in the art from this disclosure that the pedaling force detector 14 can be used with other types of bicycles.

Figure 4:
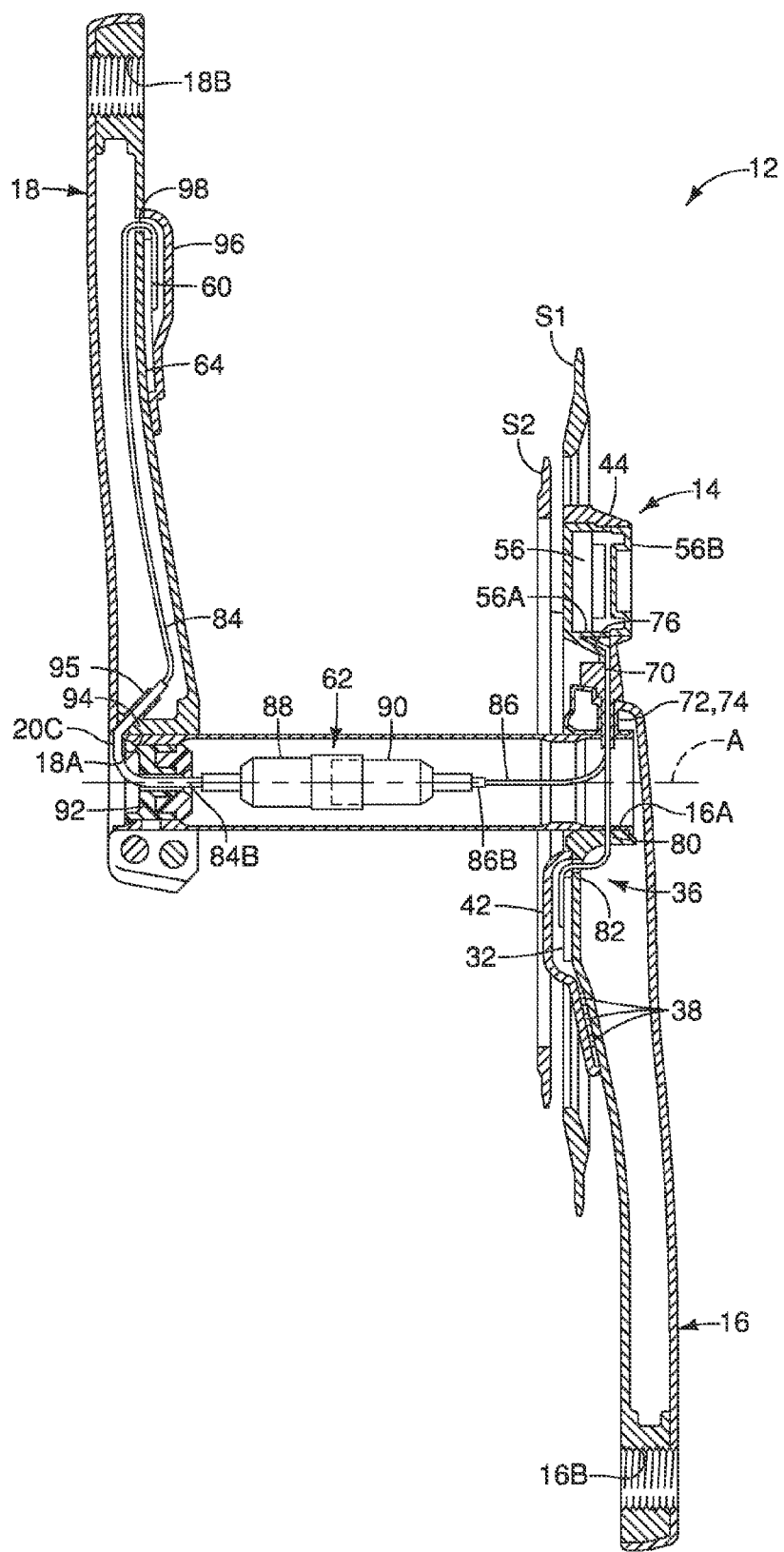
FIG. 4 is a cross sectional view of the bicycle crank assembly with the pedaling force detector illustrated in FIGS. 1 to 3 as seen along section line 4-4 of FIG. 2.

As seen in FIGS. 1 to 4, the bicycle crank assembly 12 includes a first crank arm 16, which is a right crank arm. The bicycle crank assembly 12 further includes a second crank arm 18, which is a left crank arm. The bicycle crank assembly 12 further includes a crankshaft 20. The crankshaft 20 is connected to the first crank arm 16 and the second crank arm 16. Specifically, the first and second crank arms 16 and 18 are fixedly coupled to the crankshaft 20 such that the first and second crank arms 16 and 18 extend perpendicularly from the crankshaft 20 in opposite directions. In the illustrated embodiment, the first crank arm 16 has a crankshaft receiving opening 16A which non-rotatably mates with a first end of the crankshaft 20. The first crank arm 16 is non-removably attached to the first end of the crankshaft 20. The second crank arm 18 has a crankshaft receiving opening 18A which non-rotatably mates with a second end of the crankshaft 20. The second crank arm 18 is attached to the second end of the crankshaft 20 in a releasable and reinstallable manner. In the first illustrated embodiment, the first crank arm 16 has a pair of sprockets S1 and S2. The sprockets S1 and S2 are fixedly mounted to the first crank arm 16 in a conventional manner (e.g., ring nuts and ring bolts). As seen in FIG. 4, the longitudinal center of the crankshaft 20 defines a rotational axis or crank axis A of the bicycle crank assembly 12.

Figure 2:
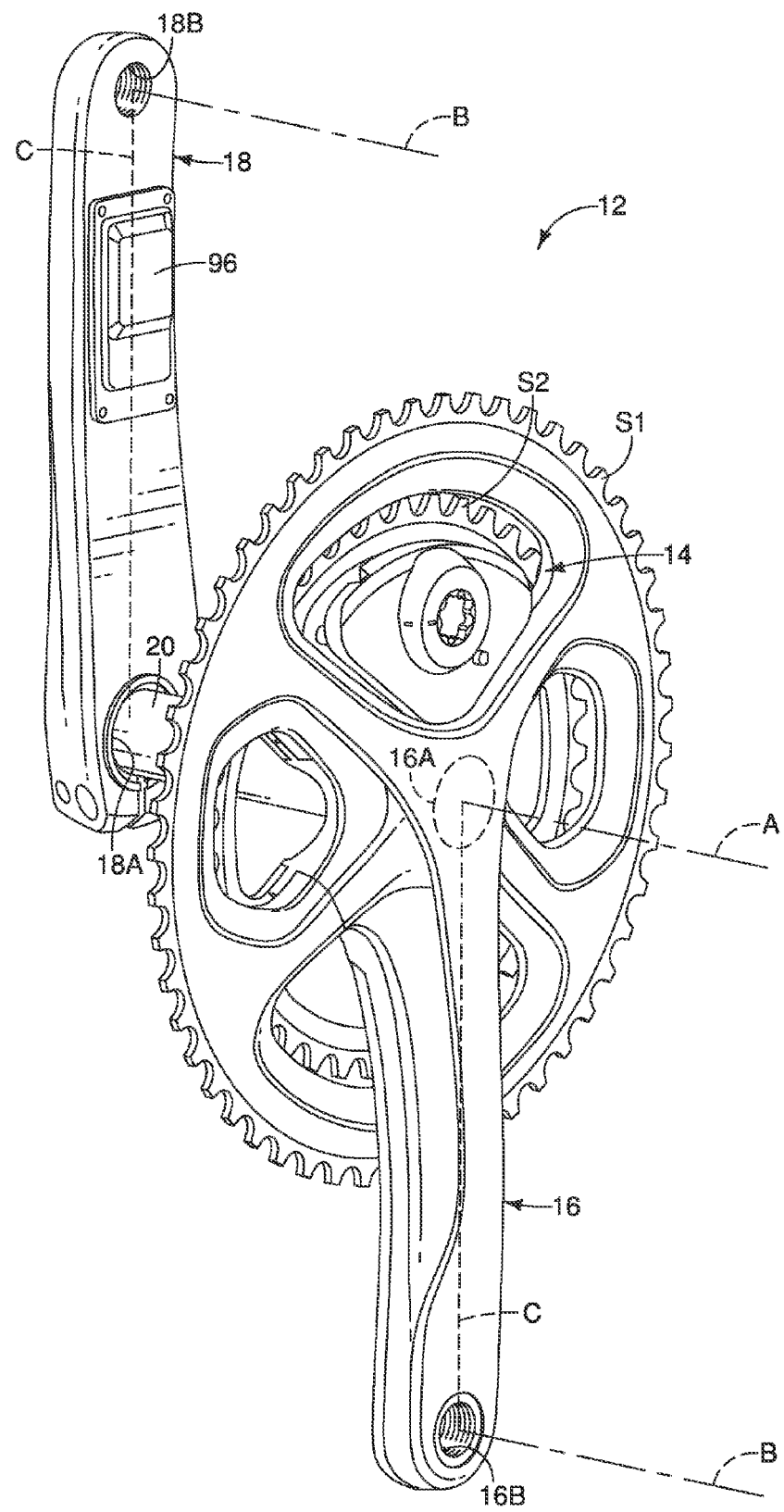
FIG. 2 is a perspective view of the bicycle crank assembly with the pedaling force detector illustrated in FIG. 1.
Figure 3:
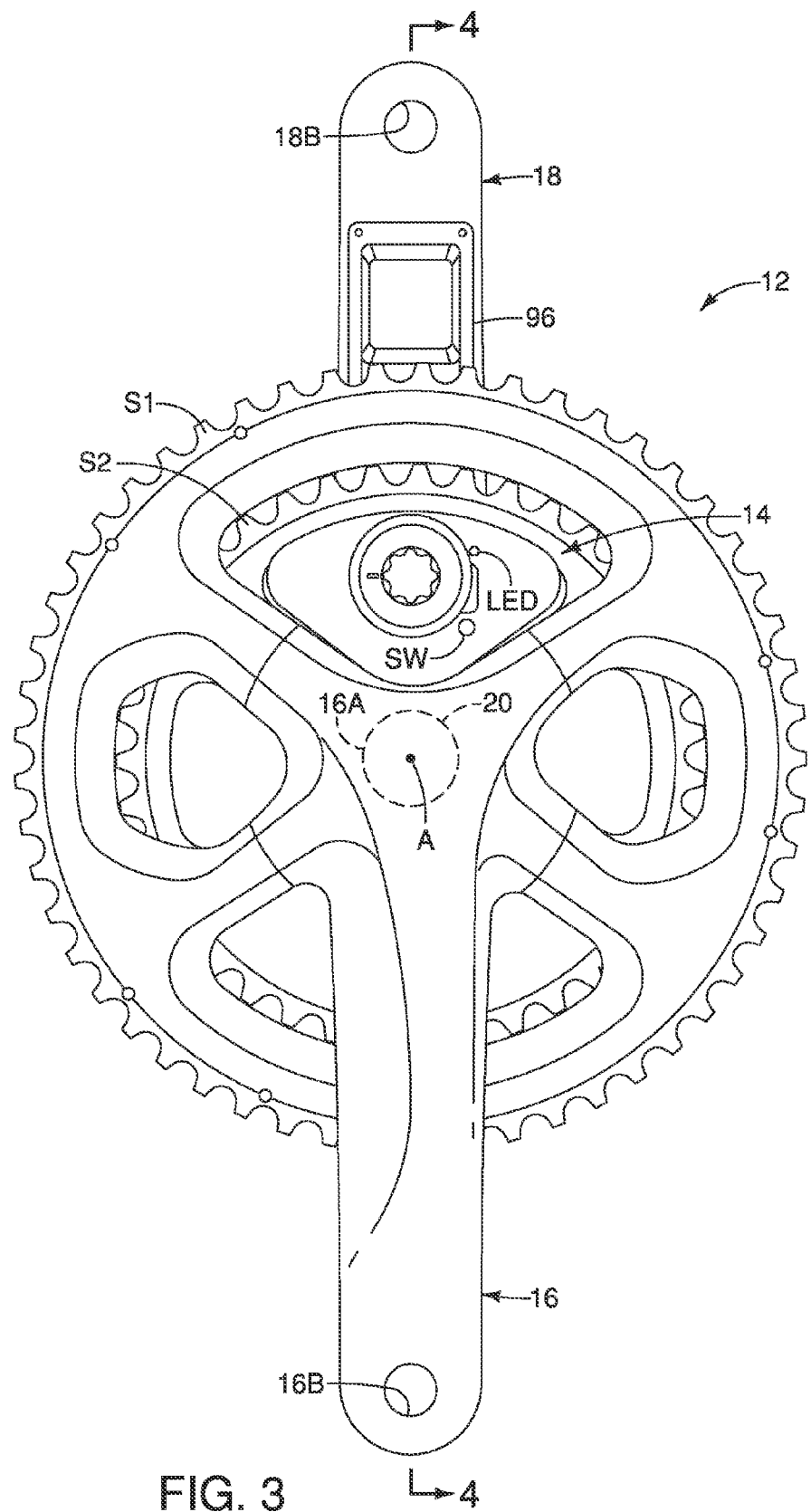
FIG. 3 is a side elevational view of the bicycle crank assembly with the pedaling force detector illustrated in FIGS. 1 and 2.

As seen in FIG. 1, the free ends of the bicycle crank arms 16 and 18 are each provided with a bicycle pedal P. In particular, as seen in FIG. 2, the bicycle crank arm 16 has a threaded opening 1613 for attaching one of the bicycle pedal P (FIG. 1) in a conventional manner. Likewise, as seen in FIG. 2, the bicycle crank arm 18 has a threaded opening 18B for attaching one of the bicycle pedal P (FIG. 1) in a conventional manner. Each of the threaded openings 18A and 18B defines a pedal axis B. Each of the bicycle crank arms 16 and 18 has a longitudinal axis C that intersects the crank (rotational) axis A and the pedal axis B. A rider applies a pedaling force on the bicycle pedals P and then this pedaling force is transmitted to the bicycle crank arms 16 and 18, which rotate about the crank (rotational) axis A for moving a bicycle chain BC to propel the bicycle 10 in a conventional manner. As explained hereinafter, the bicycle crank assembly 12 is provided with the pedaling force detector 14 that detects a pedaling force to provide information (e.g., power transmitted to the bicycle crank assembly 12), which can be conveyed to the rider and/or used by various electronic components.

Figure 5:
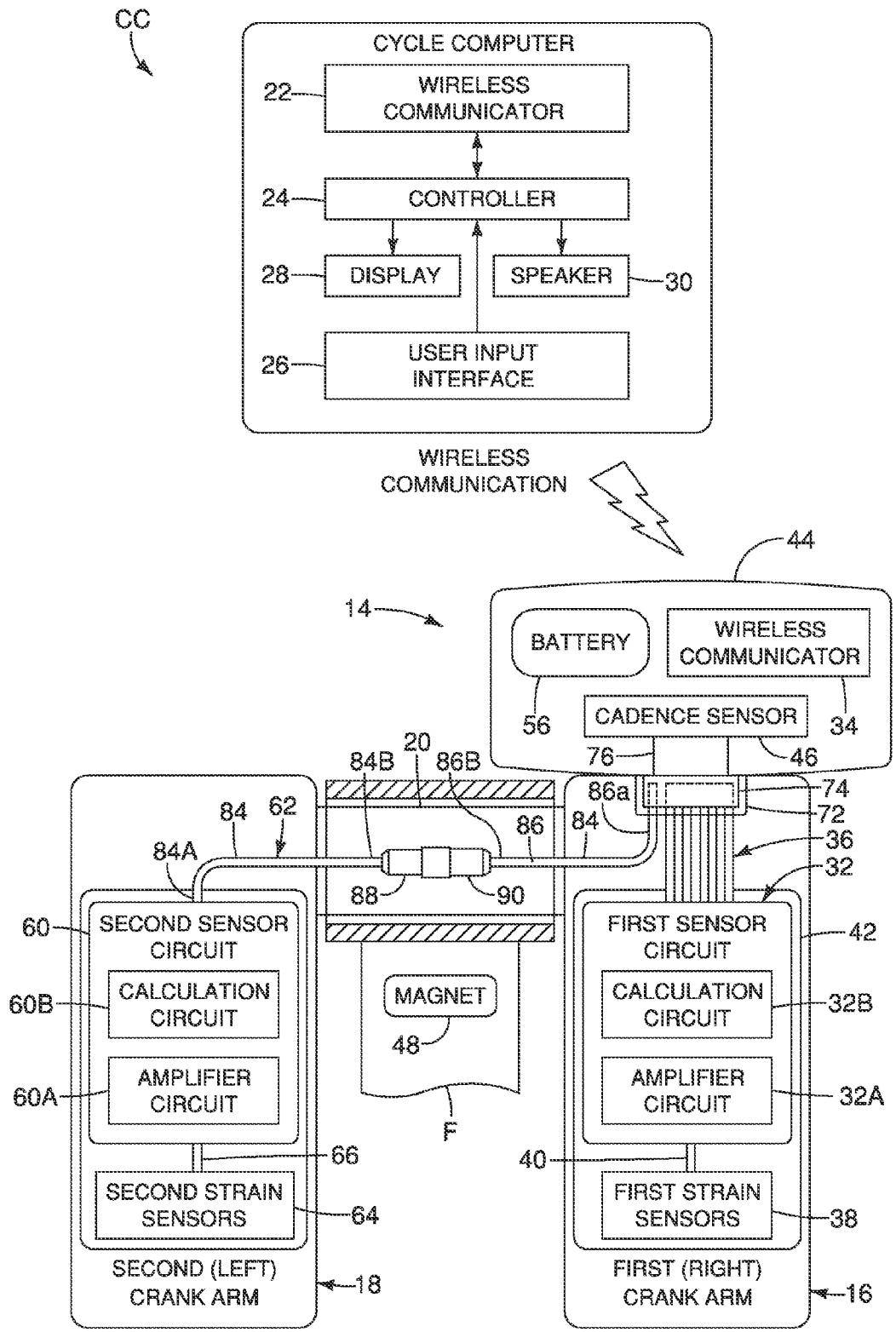
FIG. 5 is a block diagram of a bicycle input force processing apparatus that includes the pedaling force detector and a cycle computer.

Referring now to FIG. 5, a block diagram of a bicycle input force processing apparatus is illustrated that includes the cycle computer CC and the pedaling force detector 14, which is installed on the bicycle crank assembly 12. Basically, the pedaling force detector 14 wirelessly communicates with the cycle computer CC for wirelessly providing information (e.g., power transmitted to the pedaling force detector 114) to the cycle computer CC.

The cycle computer CC basically comprises a two-way wireless communicator 22 (i.e., a wireless receiver-wireless transmitter) and a controller 24. The controller 24 is a microcomputer that includes a central processing unit (CPU) or processor and other conventional components such as an input interface circuit, an output interface circuit, and storage devices such as ROM (Read Only Memory) device and RAM (Random Access Memory) device. Typically, the cycle computer CC includes a user interface 26, a display 28 and a speaker 30. Preferably, the cycle computer CC includes other conventional parts such as a replaceable battery (not shown). White the wireless communicator 22 and the controller 24 are illustrated as a part of the cycle computer CC, the wireless communicator 22 and the controller 24 can be provided separately from the cycle computer CC. For example, alternatively, the wireless communicator 22 can be connected to the cycle computer CC by one or more communication cords. It will be apparent to those skilled in the art from this disclosure that many types of wireless communicator 22 can be used for receiving the pedaling force information. Thus, the cycle computer CC will not be discussed and/or illustrated in detail herein. In addition, it will be apparent to those skilled in the art from this disclosure that many types of wireless communication are known in the wireless communication field, and wireless communication between the pedaling force detector 14 and the cycle computer CC will not be discussed and/or illustrated in detail herein. Also the controller 24 is preferably programmed to display the pedaling force information on the display 28. The controller 24 can include other programs as needed and/or desired. For example, the controller 24 can include an automatic shifting program for automatically shifting gears of the bicycle 10 based on the pedaling three information and/or other bicycle riding conditions that are detected with other sensors (not shown).

Still referring to FIG. 5, the bicycle pedaling force detector 14 basically comprises a first sensor circuit 32, a wireless communicator 34 and a first electrical connection member 36. The pedaling force detector 14 further has a plurality of first strain sensors 38. The first strain sensors 38 are electrically connected to the first sensor circuit 32 by an electrically wire 40. The electrically wire 40 can be conventional wire harnesses or a flexible printed board.

The first sensor circuit 32 is fixed to the first crank arm 16. The first electrical connection member 36 electrically connects the wireless communicator 34 and the first electrical connection member 36. The first sensor circuit 32 is a device that amplifies a strain signal, and then interprets the strain signal to generate pedaling force information. In the first embodiment, the first sensor circuit 32 includes an amplifier circuit 32A and a calculation circuit 32B. The calculation circuit 32B is electrically connected to the first strain sensors 38 via the amplifier circuit 32A. The calculation circuit 32B includes a processor which analyses an amplified signal from the amplifier circuit 32A to generate pedaling force information, which is sent to wireless communicator 34 via the first electrical connection member 36. In other words, the calculation circuit 32B outputs the pedaling force information to the wireless communicator 34 via the first electrical connection member 36. The calculation circuit 32B can calculate watt power based on an amplified signal from the amplifier circuit 32A, pedaling force information from the calculation circuit 60B and a signal from the cadence sensor 46. The calculation circuit 329 can calculate a first three in the tangential direction of excursion of the pedal axis B, a second force in a radial direction of the crank axis A and a third force (twisted force) around the longitudinal axis C of the crank arm 16. Since calculation circuits are known, the calculation circuit 32B will not be discussed and/or illustrated in detail herein.

Generally, the first strain sensors 38 output a voltage signal indicating that a force (strain) is occurring upon the surfaces that the first strain sensors 38 are mounted to. Preferably, the first strain sensors 38 are fixed to the first crank arm 16 and arranged to measure strain along several different spatial axes. The first strain sensors 38 can be fixed to an outside surface of the first crank arm 16, an inside surface of the first crank arm 16, or a combination of both an inside and an outside surface of the first crank arm 16. When the first strain sensors 38 are disposed inside of the first crank arm 16, the first strain sensors 38 can be fixed to a sensor support member (not illustrated) that is also permanently fixed to the first crank arm 16. Since strain sensors are known, the first strain sensors 38 will not be discussed and/or illustrated in detail herein.

Basically, the amplifier circuit 32A is electrically connected to the calculation circuit 32B and the first strain sensors 38. The amplifier circuit 32A amplifies a strain signal from the first strain sensors 38, and outputs the amplified signal to the calculation circuit 32B. Since amplifying circuits and the calculation circuits are known, the amplifier circuit 32A and the calculation circuit 32B will not be discussed and/or illustrated in detail herein. The first electrical connection member 36 is configured to electrically connect the wireless communicator 34 and the first sensor circuit 32. In this way, the signals from the first sensor circuit 32 are transmitted to the wireless communicator 34. Generally, the wireless communicator 34 receives and transmits wireless data to and from the cycle computer CC. Preferably, the wireless communicator 34 receives pedaling three information from the first sensor circuit 60. Thus, the wireless communicator 34 outputs wireless data including pedaling force information to the cycle computer CC.

The first strain sensors 38 are fixed to the first crank arm 16. In the first embodiment, the first strain sensors 38 are fixed to an exterior of the first crank arm 16. Preferably, the first strain sensors 38 are permanently mounted to the first crank arm 16 by adhesive. Of course, it will be apparent from this disclosure that the first strain sensors 38 can be permanently mounted to the first crank arm 16 by other types of fastening methods. In any case, the first strain sensors 38 are fixed to the first crank arm 16 in order to measure torque or power being applied to the first crank arm 16. The information from the first strain sensors 38 then can be used by the first sensor circuit 32 to calculate the effort exerted by the rider.

Figure 6:
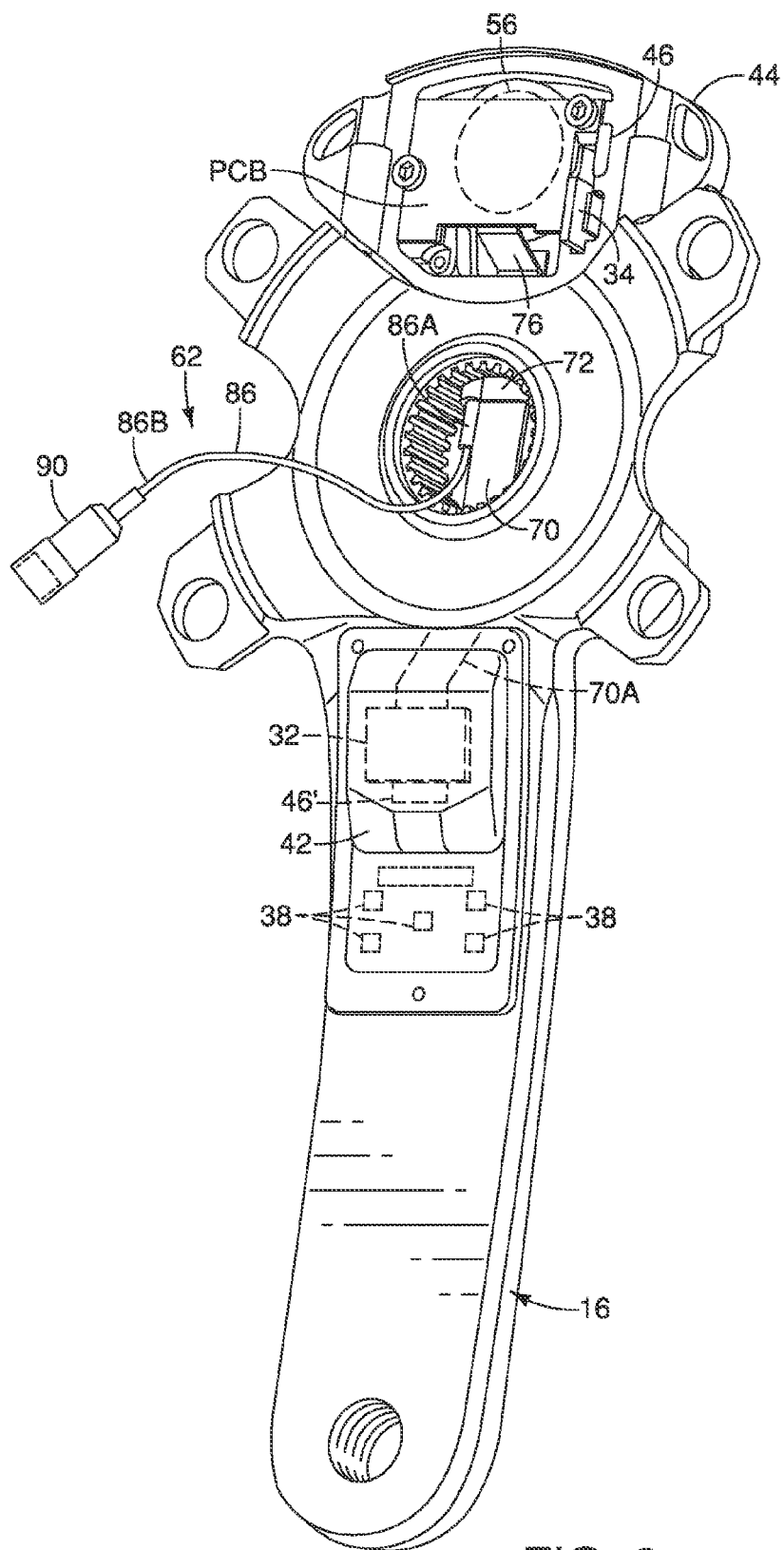
FIG. 6 is an inside perspective view of the right crank arm with a sensor circuit and a wireless communicator attached thereto of the pedaling force detector illustrated in FIGS. 1 to 4.
Figure 7:
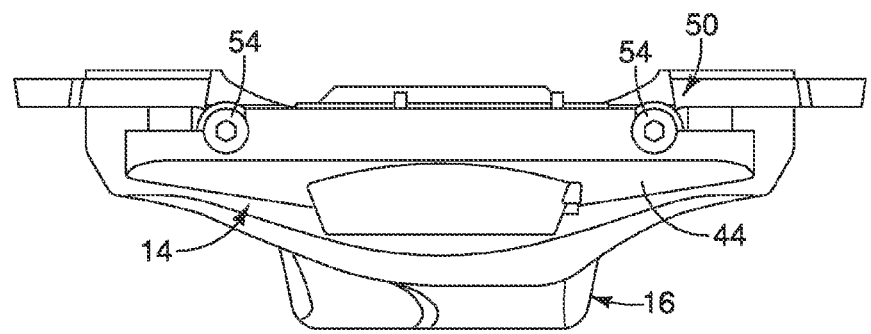
FIG. 7 is a top plan view of the right crank arm with the wireless communicator mounted thereto as illustrated in FIG. 6.
Figure 8:
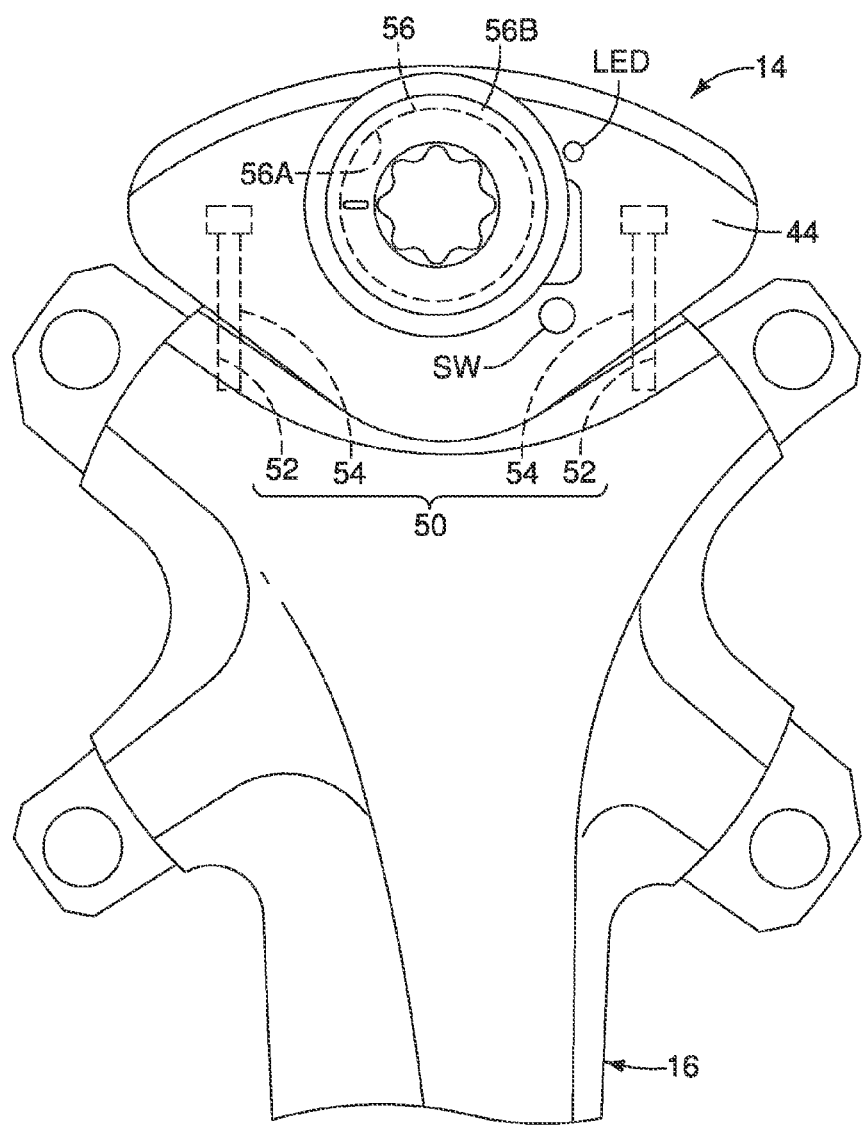
FIG. 8 is a partial side elevational view of the crank arm with the wireless communicator illustrated in FIGS. 6 and 7.
Figure 9:
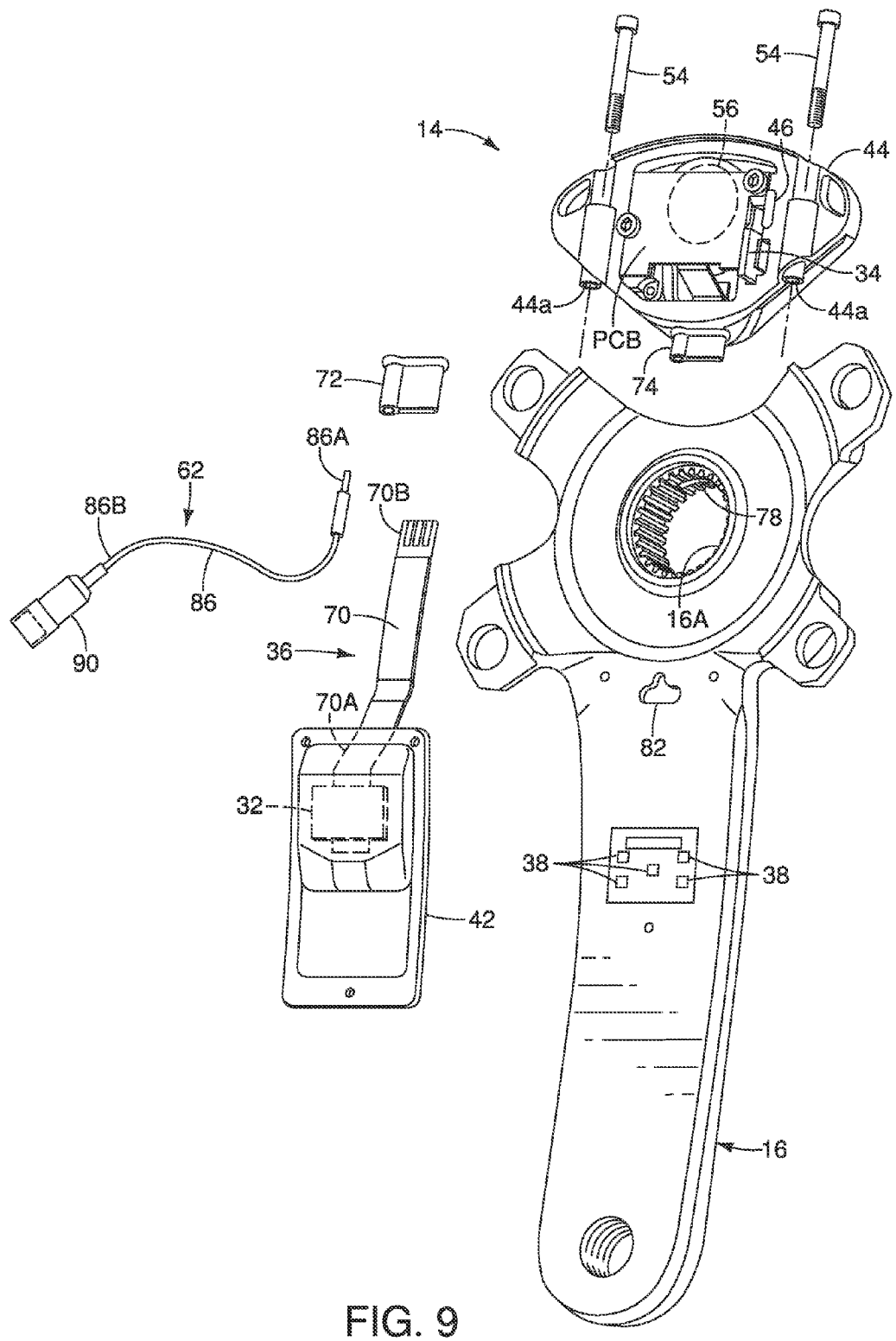
FIG. 9 is an exploded perspective view of the right crank arm, the sensor circuit and the wireless communicator of the pedaling force detector illustrated in FIGS. 1 to 4.
Figure 10:
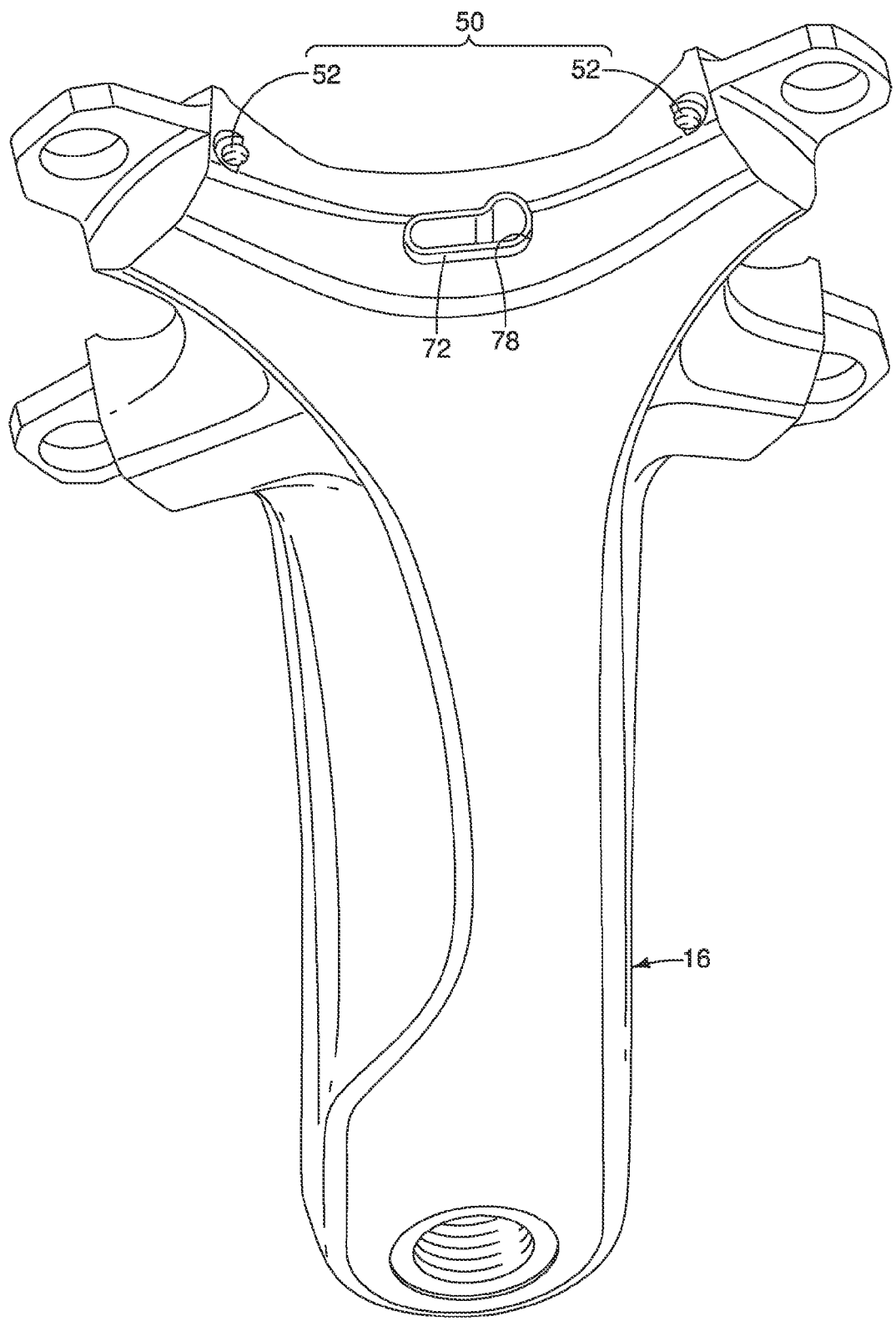
FIG. 10 is a top perspective view of the right crank arm illustrated in FIG. 6 with the wireless communicator removed.

As seen in FIG. 6, the first sensor circuit 32 is disposed in a first housing 42 that is configured to be mounted to the crank assembly 12. In particular, the first sensor circuit 32 is configured to be mounted to the first crank arm 16 by the first housing 42. Preferably, the first sensor circuit 32 is configured to be permanently mounted to the first crank arm 16 of the crank assembly 12. For example, as illustrated, the first sensor circuit 32 is adhesively attached on the first crank arm 16 with the first housing 42 overlying the first sensor circuit 32 to protect the first sensor circuit 32. Alternatively, the first sensor circuit 32 can be mounted to the first housing 42, which in turn is permanently mounted to the first crank arm 16 by a bonding material (adhesive, solder, weld, etc.) and/or rivets. The wireless communicator 34 is disposed in a second housing 44 that is configured to be detachably mounted to the crank assembly 12. In particular, the wireless communicator 34 is configured to be detachably mounted to the first crank arm 16 by the second housing 44. The first electrical connection member 36 is configured to electrically connect the wireless communicator 34 and the first sensor circuit 32. In this way, the second housing 44 is a separate member from the first housing 42. In the first embodiment, the first sensor circuit 32 is configured to be mounted outside of the first crank arm 16.

The pedaling force detector 14 further includes a cadence sensor 46 that is attached to one of the first housing 42 and the second housing 44. In the first embodiment, the second housing 44 includes a printed circuit board PCB that is detachable from the rest of the second housing 44. The first electrical connection member 36 is electrically connected to the printed circuit board PCB, which in turn is electrically connected to the wireless communicator 34. In the first embodiment, the cadence sensor 46 is mounted to the second housing 44. Alternatively, as seen in FIG. 6, a cadence sensor 46' can be mounted to the first housing 42 as shown in dashed lines. In any case, the cadence sensor 46 or 46' is electrically connected of the wireless communicator 34 such that the wireless communicator 34 receives a signal from the cadence sensor 46 or 46' that is indicative of the pedaling cadence of the crank assembly 12. The cadence sensor 46 is a device that detects the revolutions per minute (RPM) of the crank assembly 12 about the center crank axis of the crankshaft 20. The cadence sensor 46 can, for example, be a magnetic field detecting device (e.g., a reed switch) that detects a magnetic field of a magnet 48 that is attached to the bicycle frame F as diagrammatically illustrated in FIG. 5. The cadence sensor 46 can be mounted at any suitable location that detects the magnetic field of the magnet 48. In the first embodiment, the cadence sensor 46 is mounted to the second housing 44, which is made of a material, such as plastic, that allows magnetic flux to pass therethrough to activate the cadence sensor 46 (e.g., a reed switch). The wireless communicator 34 is then further configured to wirelessly output cadence information received from the cadence sensor 46 to the cycle computer CC.

In the first embodiment, as seen in FIGS. 7 to 10, the first crank arm 16 includes a fixing structure 50. The second housing 44 is configured to be detachably attached to the fixing structure 50. Here, in the first embodiment, the fixing structure 50 includes a pair of threaded bores 52 formed in the first crank arm 116 and a pair of fixing bolts 54. The second housing 44 has a pair of unthreaded through bores 44a for receiving the fixing bolts 54 therethrough. The fixing bolts 54 may be unscrewed from the threaded bores 52 to detach the wireless communicator housing 44 from the first crank arm 16. In this way, the second housing 44 is detachably attached to the first crank arm 16 by the fixing structure 50. Thus, the phrase "detachably attached" as used herein when referring to an attachment between first and second structures means that the first structure can be detached from and reinstalled to the second structure without having to break and/or repair the connection therebetween. It will be apparent to those skilled in the art from this disclosure that the threaded bores 52 and the fixing bolts 54 of the fixing structure 50 can alternatively be replaced with other conventional detachable fixing arrangements such as a snap-fit connection. Thus, other detachable fixing arrangements will not be discussed and/or illustrated in detail herein.

Figure 13:
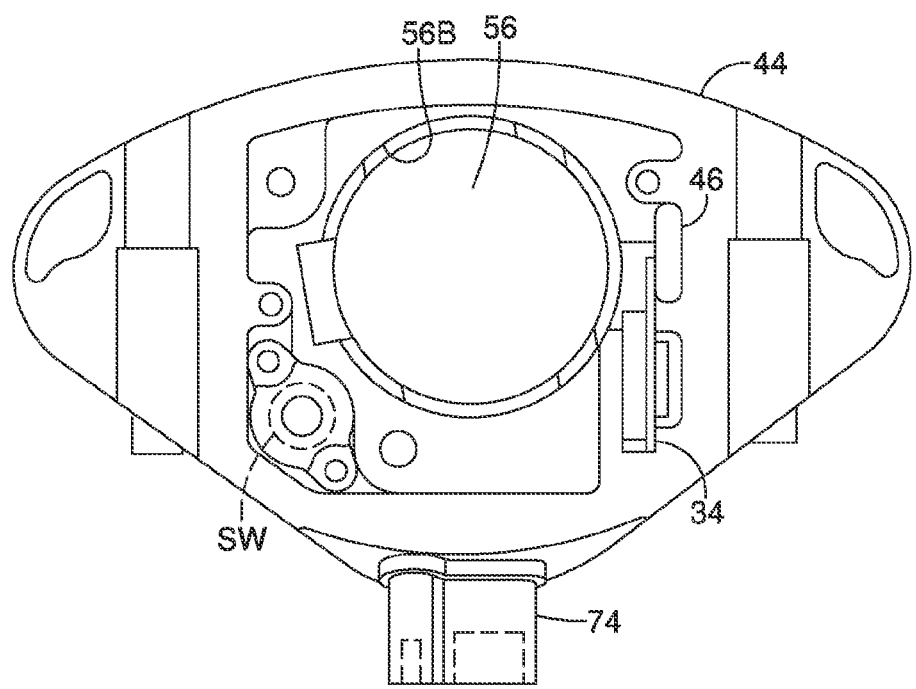
FIG. 13 is an inside elevational view of the wireless communicator illustrated in FIG. 11 of the pedaling force detector illustrated in FIGS. 1 to 4 with the printed circuit board and the battery receiving structure removed to show the battery.

In the first embodiment, a battery 56 is disposed in the second housing 44 for supplying power to the electrical components of the pedaling force detector 14 that are installed on the bicycle crank assembly 12. The battery 56 is electrically connected to the main printed circuit board PCB. In the first embodiment, the second housing 44 further includes a battery receiving structure 56A (i.e., an internal support defining a recess in the second housing 44 in the first embodiment) that supports the battery 56. The battery receiving structure 56A can be an integral part of the second housing 44, a removable structure, or a part of the printed circuit board PCB. In FIG. 13, the printed circuit board PCB and the battery receiving structure 56A have been removed to show the battery 56 inside the second housing 44. Preferably, the second housing 44 has a detachable cover 569 for retaining the battery 56 in the battery receiving structure 56A (i.e., a recess in the second housing 44 in the first embodiment). In this way, the battery 56 is detachably attached to the battery receiving structure 56A. The battery 56 can be, for example, a coin battery, a dry cell battery, and/or a rechargeable dry cell battery that is mounted on the battery receiving structure 56A. Alternatively, power for the electrical components of the pedaling force detector 14 can also be provided by one or more solar cells that are affixed to the bicycle crank assembly 12 and/or the pedaling force detector 14. Alternatively, power for the electrical components of the pedaling force detector 14 can be generated from piezoelectric devices or any combination of batteries, solar cells, piezoelectric devices, and other suitable power sources. Since batteries are known, further details regarding the battery 56 will not be discussed and/or illustrated in detail herein.

Referring back to FIG. 5, the bicycle pedaling force detector 14 further comprises a second sensor circuit 60 and a second electrical connection member 62. The pedaling force detector 14 further has a plurality of second strain sensors 64. The second strain sensors 64 are electrically connected to the second sensor circuit 60 by an electrically wire 66. The electrically wire 66 can be an electric cable or a flexible print board.

The second sensor circuit 60 is fixed to the second crank arm 18. The second electrical connection member 62 extends through the crankshaft 20, and electrically connects the wireless communicator 34 and the second sensor circuit 60. The second sensor circuit 60 is a device that amplifies a strain signal, and then interprets the strain signal to generate pedaling force information. In the first embodiment, the second sensor circuit 60 includes an amplifier circuit 60A and a calculation circuit 60B. The calculation circuit 60B is electrically connected to the second strain sensors 64 via the amplifier circuit 60A. The calculation circuit 60B includes a processor which analyses an amplified signal from the amplifier circuit 60A to generate pedaling force information, which is sent to wireless communicator 34 via the second electrical connection member 62. In other words, the calculation circuit 60B then outputs the pedaling force information to the wireless communicator 34 via the second electrical connection member 62. The calculation circuit 60B can calculate a first force in the tangential direction of excursion of the pedal axis B, a second force in a radial direction of the crank axis A and a third force (twisted force) around the longitudinal axis C of the crank arm 18. Since calculation circuits are known, the calculation circuit 60B will not be discussed and/or illustrated in detail herein.

Generally, the second strain sensors 64 output a voltage signal indicating that a force (strain) is occurring upon the surfaces that the second strain sensors 64 are mounted to. Preferably, the second strain sensors 64 are fixed to the second crank arm 18 and arranged to measure strain along several different spatial axes. The second strain sensors 64 can be fixed to an outside surface of the second crank arm 18, an inside surface of the second crank arm 18, or a combination of both an inside and an outside surface of the second crank arm 18. When the second strain sensors 64 are disposed inside of the second crank arm 18, the second strain sensors 64 can be fixed to a sensor support member (not illustrated) that is also permanently fixed to the second crank arm 18. Since strain sensors are known, the second strain sensors 64 will not be discussed and/or illustrated in detail herein.

Now, the wireless communicator 34 will be briefly discussed. The wireless communicator 34 is a conventional component. The wireless communicator 34 basically includes a processor that controls communications between the cycle computer CC and the first and second sensor circuits 32 and 60. The wireless communicator 34 includes an antenna that can send wireless data that is stored in a storage device of the wireless communicator 34. The antenna can also receive wireless data that is stored in the storage device of the wireless communicator 34. The wireless communicator 34 receives pedaling force information from the first and second sensor circuits 32 and 60 via a physical electrical connection via the first and second electrical connection members 36 and 62. The wireless communicator 34 then wirelessly transmits information to the cycle computer CC.

Figure 11:
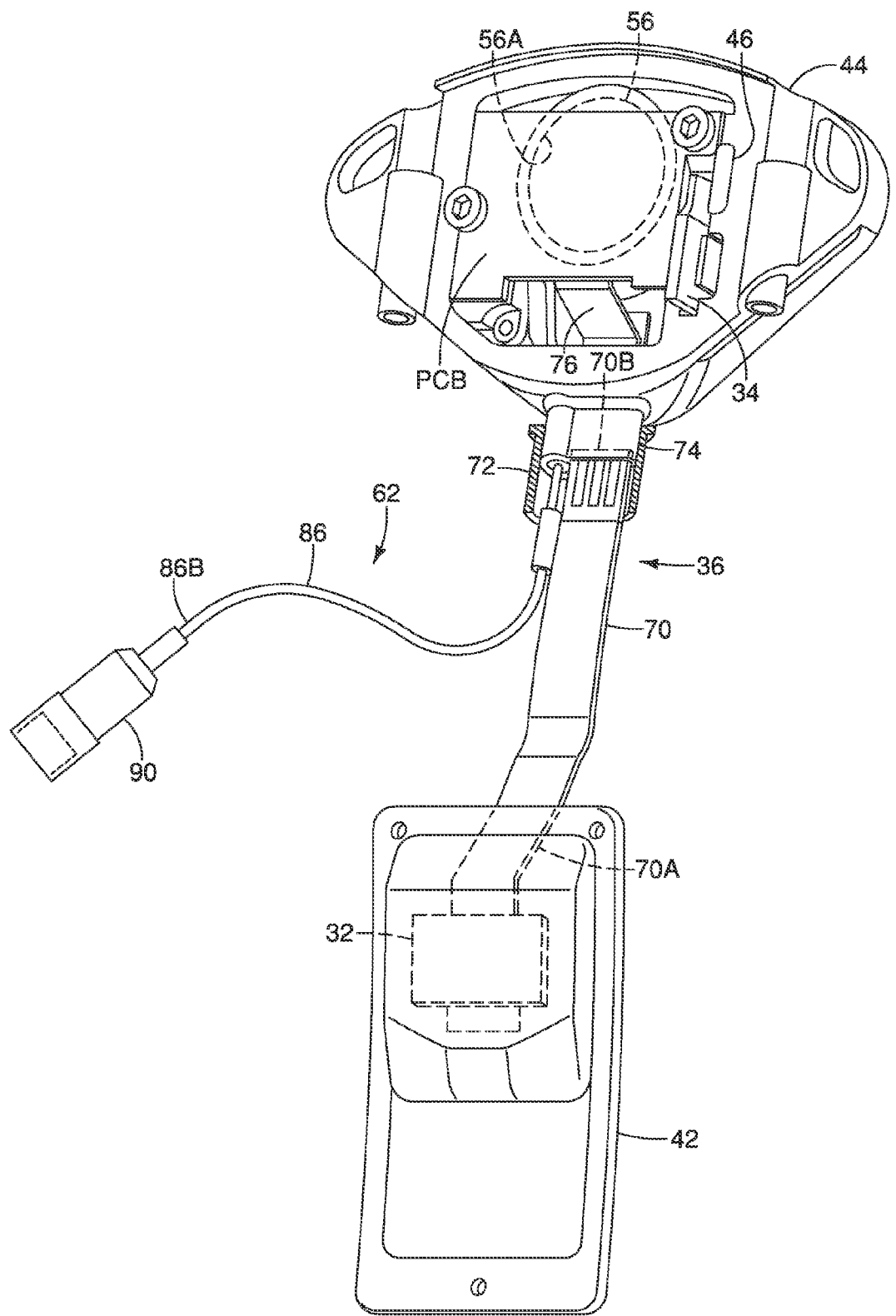
FIG. 11 is a perspective view of the sensor circuit and the wireless communicator interconnected by the electrical connection member.
Figure 12:
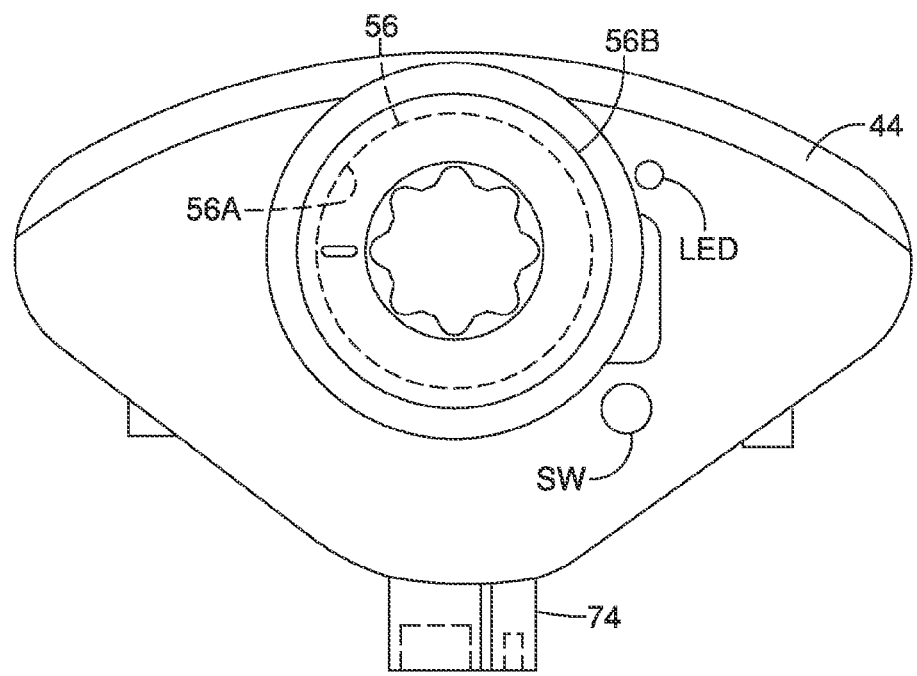
FIG. 12 is an outside elevational view of the wireless communicator of the pedaling force detector illustrated in FIGS. 1 to 4.

In the first embodiment, as seen in FIG. 12, the second housing 44 is provided with a calibration switch SW and an indicator light LED. As seen in FIGS. 11 to 13, the calibration switch SW and the indicator light LED (FIG. 12) are electrically connected to the printed circuit board PCB (FIG. 11) that is electrically connected to the wireless communicator 34 (FIG. 13). The calibration switch SW is used to calibrate the first and second sensor circuits 32 and 60 using a calibrate circuit and/or program. The processor, memory and circuitry for calibrating the first and second sensor circuits 32 and 60 is provided on the printed circuit board PCB of the second housing 44. The indicator light LED can be any light source, preferably an LED. The indicator light LED can use color codes to indicate various operating conditions. For example, the indicator light LED flashes on and off during calibration of the first and second sensor circuits 32 and 60. The indicator light LED is also electrically connected to the battery 56 (FIG. 13) for indicating the power level of the battery 56. For example, the indicator light LED emits a green light when the power level of the battery 56 is sufficient to operate the electrical components of the pedaling force detector 14. The indicator light LED emits a flashing red light when the power level of the battery 56 is low (i.e., insufficient to operate the electrical components of the pedaling force detector 14). The processor, memory and circuitry for controlling the indicator light LED to indicate the power level of the battery 56 is provided on the printed circuit board PCB of the second housing 44.

Now, the first electrical connection member 36 of the first embodiment will now be discussed in greater detail. The first electrical connection member 36 includes an electrical wire 70 that has a first end 70A electrically connected to the first sensor circuit 32. Preferably, the first end 70A is hardwired to the first sensor circuit 32. The first electrical connection member 36 further includes a first connector 72 and a second connector 74. The first connector 72 is connected to a second end 70B of the electrical wire 70. The first electrical connection member 36 further includes an electrical wire 76 that has a first end 76A electrically connected to the wireless communicator 34. A second end 76B of the electrical wire 76 is connected to the second connector 74. Each of the electrical wires 70 and 76 has a plurality of electrical conductors for carrying signals from the first sensor circuit 32 to the wireless communicator 34. Here, in the first embodiment, the electrical wires 70 and 76 are flexible printed boards (i.e., a plurality of electrical conductors bonded to a thin dielectric film). Alternatively, the electrical wires 70 and 76 can be conventional wire harnesses.

In the first embodiment, the first connector 72 is mounted on the first crank arm 16. The second connector 74 is mounted on the wireless communicator 34. The second connector 74 is detachably connected to the first connector 72 when the wireless communicator 34 is detachably mounted to the first crank arm 16. In this way, when the second housing 44 is detached from the first crank arm 16, the first and second connectors 72 and 74 instantly disconnect from each other. Likewise, when the second housing 44 is attached to the first crank arm 16, the first and second connectors 72 and 74 instantly connect to each other. The first connector 72 is disposed in the first hole 78. Here, the first connector 72 is a female connector, while the second connector 74 is a male connector. Thus, the second connector 74 plugs into the first connector 72. Of course, it will be apparent from this disclosure that the first connector 72 can be a male connector, and the second connector 74 can be a female connector, if needed and/or desired.

In the first embodiment, to accommodate the electrical connection member 36, the first crank arm 16 includes a first hole 78. The second end 709 of the electrical wire 70 is connected to the first connector 72. Thus, the electrical wire 70 is at least partially disposed in the first hole 78. The first hole 78 is an oblong passageway that extends from an exterior surface of the first crank arm 16 to the crankshaft receiving opening 16A of the first crank arm 16. The first crank arm 16 further includes a second hole 80 in which the electrical wire 70 passes from the receiving opening 16A to an interior area of the first crank arm 16. The first crank arm 116 further includes a third hole 82 in which the electrical wire 70 passes from the interior area of the first crank arm 16 to the exterior of the first crank arm 16, where the first end 70A is electrically connected to the first sensor circuit 32.

Now, the second electrical connection member 62 of the first embodiment will now be discussed in greater detail. The second electrical connection member 62 includes two electrical wires 84 and 86 that are coupled together by a pair of mating electrical connectors 88 and 90. The second electrical connection member 62 transmits signals from the second sensor circuit 60 to the wireless communicator 34. The electrical wire 84 has a first end 84A that is electrically connected to the second sensor circuit 60. Preferably, the first end 84A is hardwired to the second sensor circuit 60. The electrical wire 84 has a second end 84B that is electrically connected to the mating electrical connector 88. The electrical wire 86 has a first end 86A that is electrically connected to the first connector 72. Preferably, the first end 86A is plugged into the first connector 72 so that the electrical wire 86 can be easily detached. The electrical wire 86 has a second end 869 that is electrically connected to the mating electrical connector 90. With this arrangement, the second sensor circuit 60 can be disconnected from the wireless communicator 34. Also with this arrangement, the second crank arm 18 can be replaced with a conventional crank arm that does not have any electrical components such as the second sensor circuit 60 and the second strain sensors 64.

Figure 14:
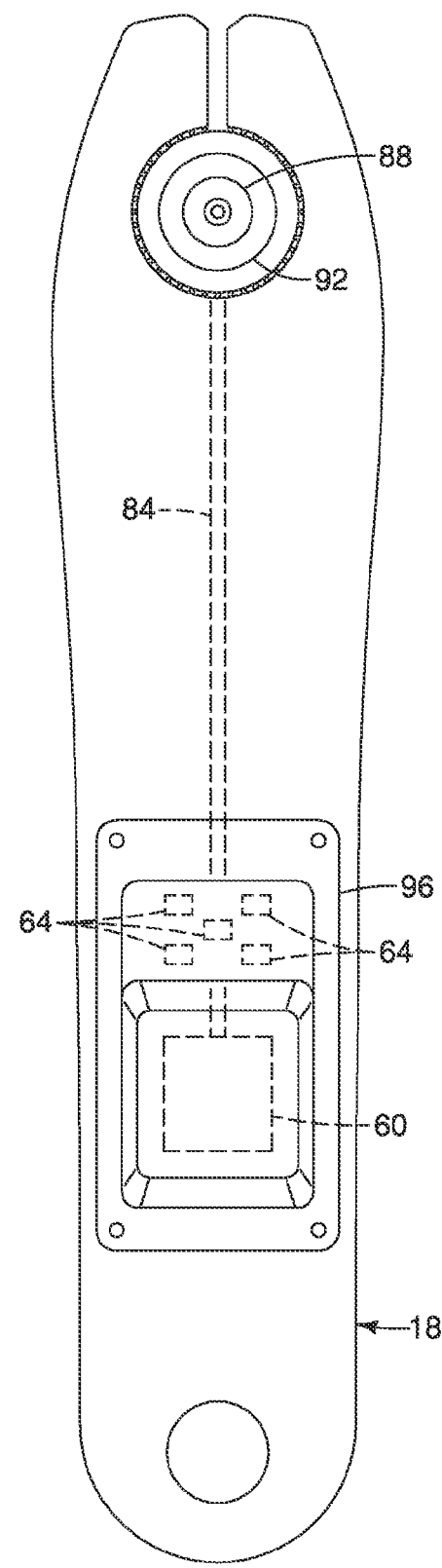
FIG. 14 is an inside elevational view of the left crank arm incorporating part of the pedaling force detector illustrated in FIGS. 1 to 4.
Figure 15:
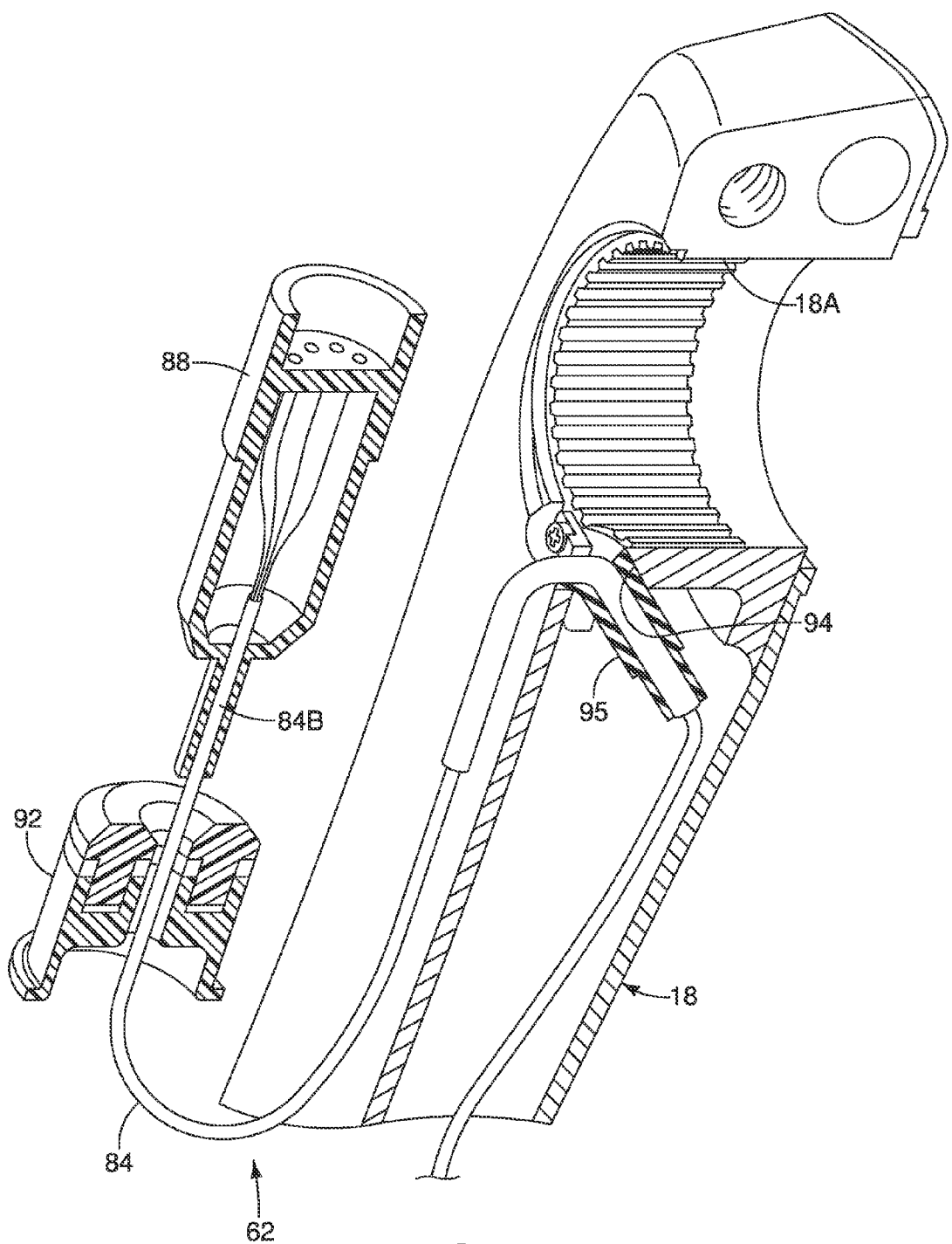
FIG. 15 is a perspective view of the left crank arm illustrated in FIG. 14 with a portion broken away for illustrating the electrical wire passing out of the left crank arm into the crankshaft receiving opening.

As seen in FIGS. 4, 14 and 15, the crankshaft receiving opening 18A of the second crank arm 18 is preferably provided with a waterproof cap 92 that substantially closes of the crankshaft receiving opening 18A. The electrical wire 84 passes through a center bore of the waterproof cap 92. The electrical wire 84 passes through a hole 94 that extends from the crankshaft receiving opening 18A to the interior of the second crank arm 18. Preferably, a rubber grommet 95 is disposed in the hole 94 for protecting the electrical wire 84.

As seen in FIGS. 4 and 14, the second sensor circuit 60 is configured to be permanently mounted to the second crank arm 18 of the crank assembly 12. For example, as illustrated, the second sensor circuit 60 is adhesively attached on the second crank arm 18 with a sensor housing 96 overlying the first second sensor circuit 60 to protect the second sensor circuit 60. Alternatively, the second sensor circuit 60 can be mounted to the sensor housing 96, which in turn is permanently mounted to the second crank arm by a bonding material (adhesive, solder, weld, etc.) and/or rivets. The second crank arm 18 has a hole 98 that the electrical wire 84 passes through for connection to the second sensor circuit 60.

As mentioned above, the second strain sensors 64 are electrically connected to the second sensor circuit 60. The second strain sensors 64 are fixed to the second crank arm 18. In the first embodiment, the second strain sensors 64 are fixed to an exterior of the second crank arm 18. Preferably, the second strain sensors 64 are permanently mounted to the second crank arm 18 by adhesive. Of course, it will be apparent from this disclosure that the second strain sensors 64 can be permanently mounted to the second crank arm 18 by other types of fastening methods. In any case, the second strain sensors 64 are fixed to the second crank arm 18 in order to measure torque or power being applied to the second crank arm 18. The information from the second strain sensors 64 then can be used by the second sensor circuit 60 to calculate the effort exerted by the rider. The second sensor circuit 60 outputs signals, which are transmitted to the wireless communicator 34 via the second electrical connection member 62.

Figure 16:
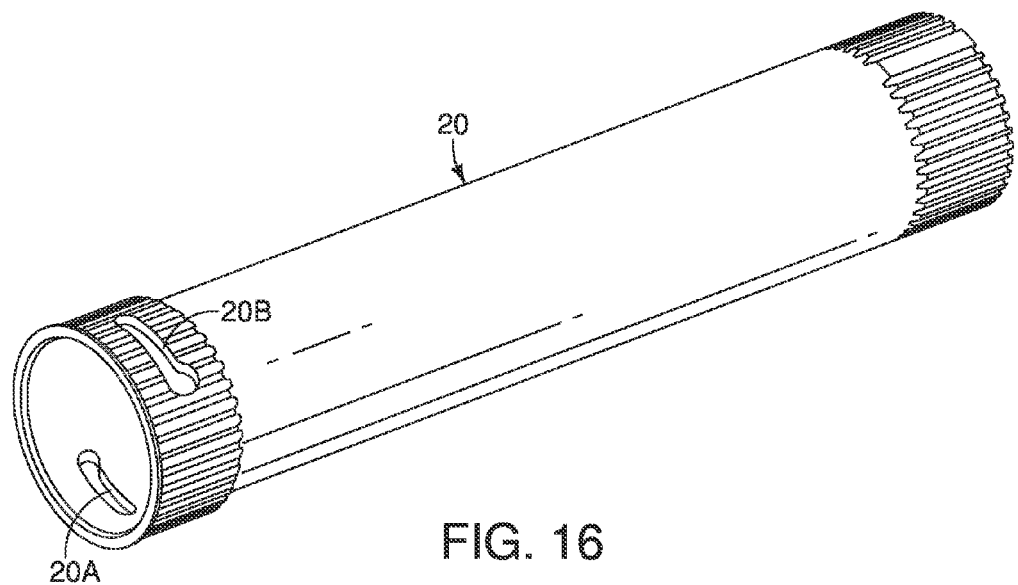
FIG. 16 is a perspective view of the crankshaft that is used with the pedaling force detector illustrated in FIGS. 1 to 4.
Figure 17:
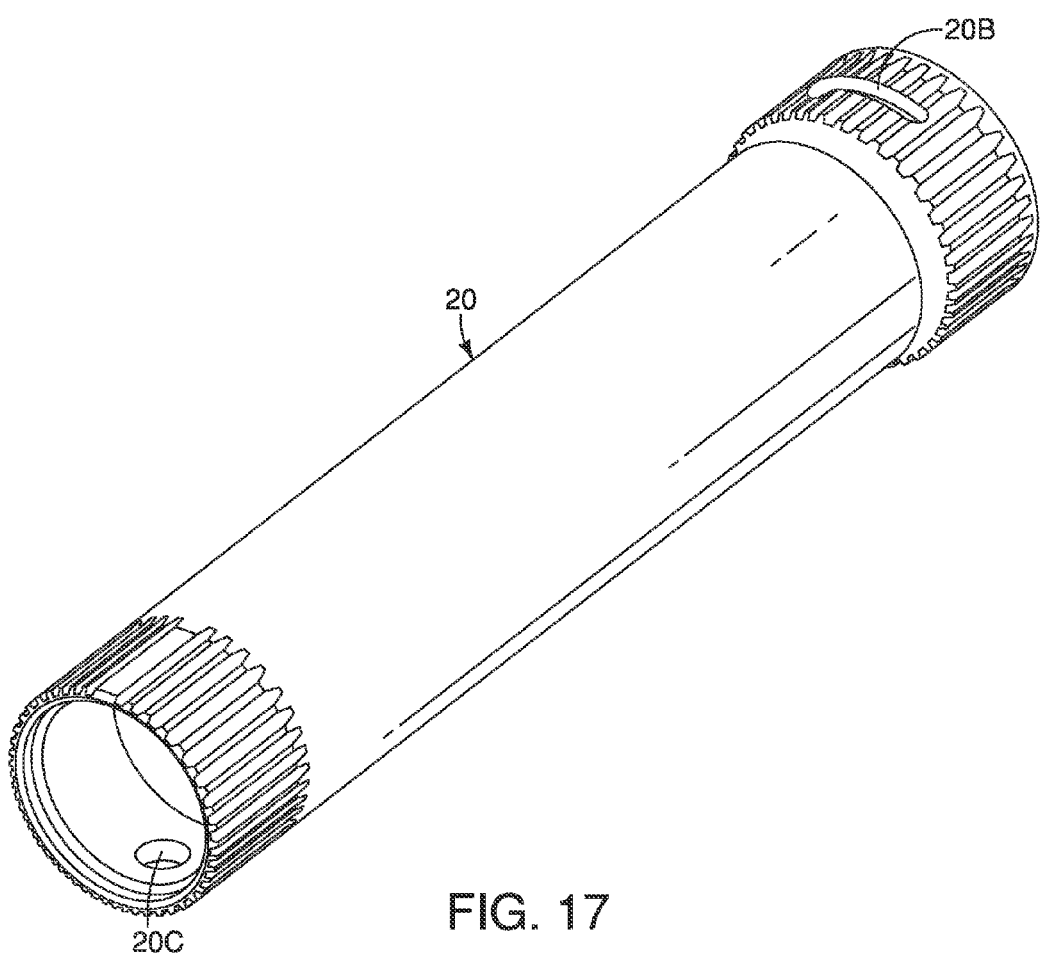
FIG. 17 is a another perspective view of the crankshaft illustrated in FIG. 15 pedaling.

Referring to FIGS. 16 and 17, the crankshaft 20 is illustrated by itself. Since crankshafts are generally well known, the crankshaft 20 will not be discussed and/or illustrated in detail herein, expect to the extent that the crankshaft 20 differs from a conventional crankshaft. Basically, the crankshaft 20 is arranged such that the first and second crank arms 16 and 18 are fixed to opposite ends of the crankshaft 20 and extend in opposite radial directions. For example, each end of the crankshaft 20 has a plurality of splines for non-rotatable fixing the first and second crank arms 16 and 18 thereto in a desired orientation. This arrangement is such that the first and second crank arms 16 and 18 rotate together as a unit with the crankshaft 20. The crankshaft 20 is hollow member in which the second electrical connection member 62 passes therethrough as seen in FIG. 4. Here, the crankshaft 20 has a pair of openings 20A and 20B for the electrical wire 70 to pass through the crankshaft 20. The crankshaft 20 also has an opening 20C for the electrical wire 84 to pass therethrough. In this way, the wiring of the electrical components does not need to run along the exterior surfaces of the first and second crank arms 16 and 18.

Figure 18:
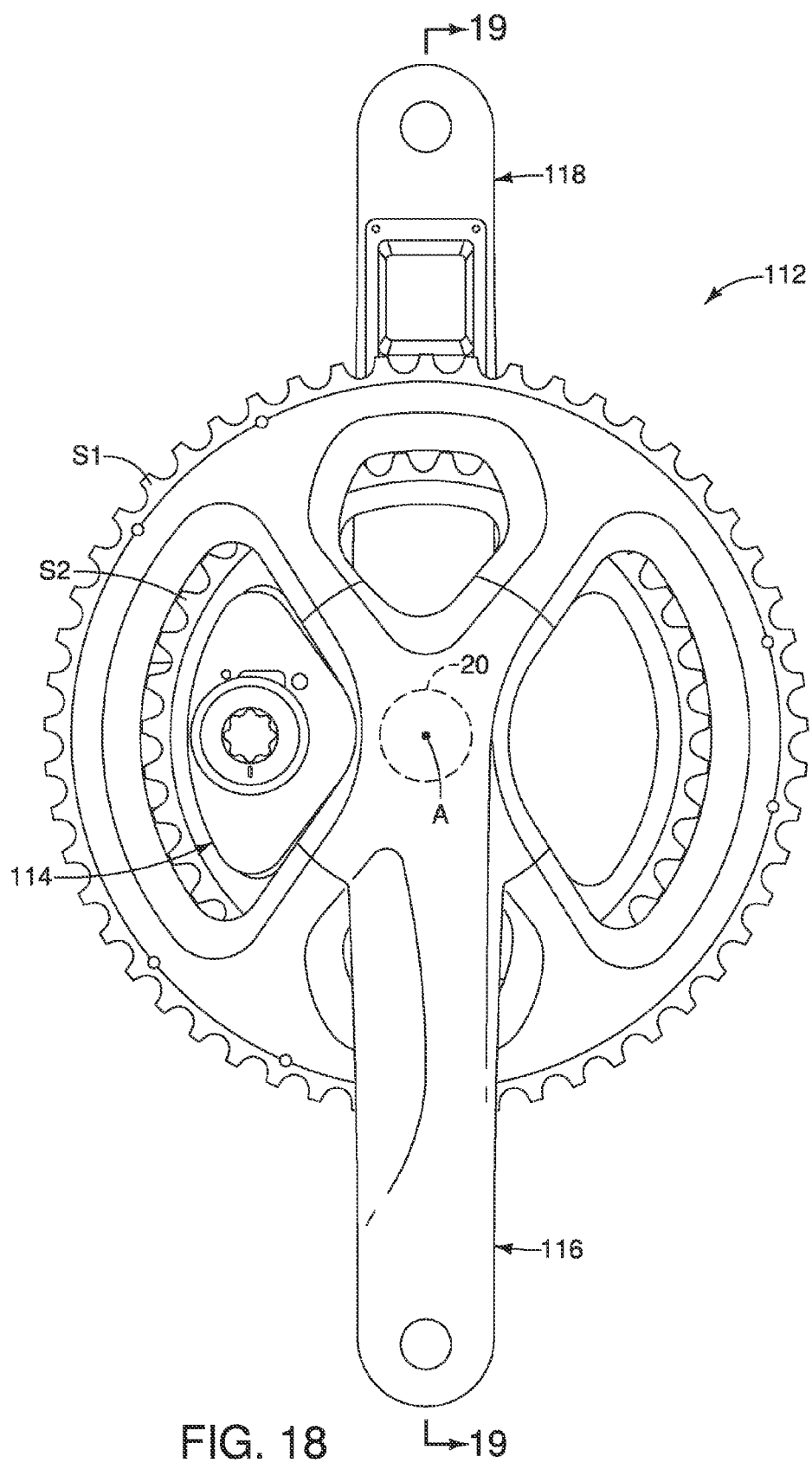
FIG. 18 is a side elevational view of a bicycle crank assembly with a pedaling force detector in accordance with a second embodiment.
Figure 19:
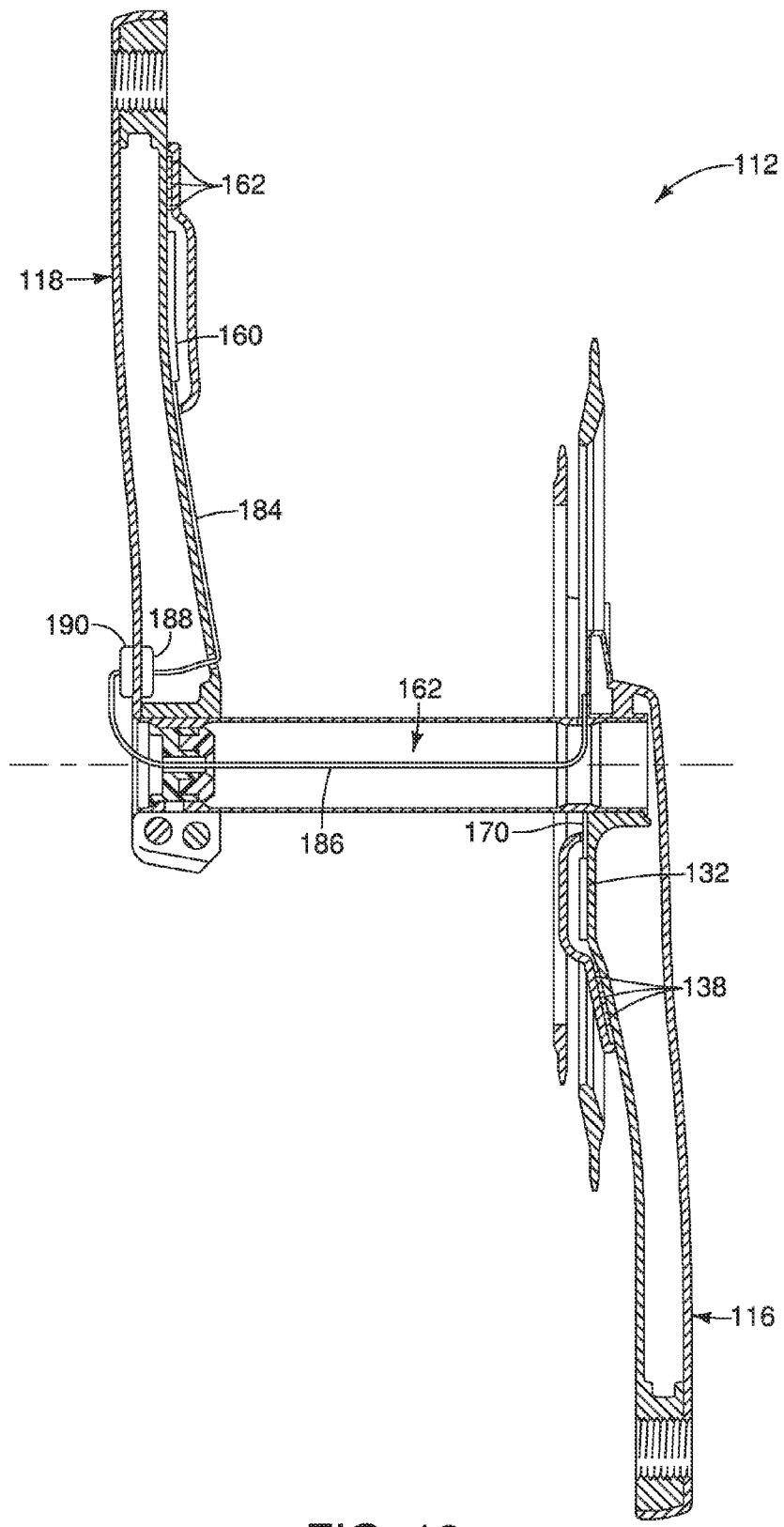
FIG. 19 is a cross sectional view of the bicycle crank assembly as seen along section line 19-19 of FIG. 18.
Figure 20:
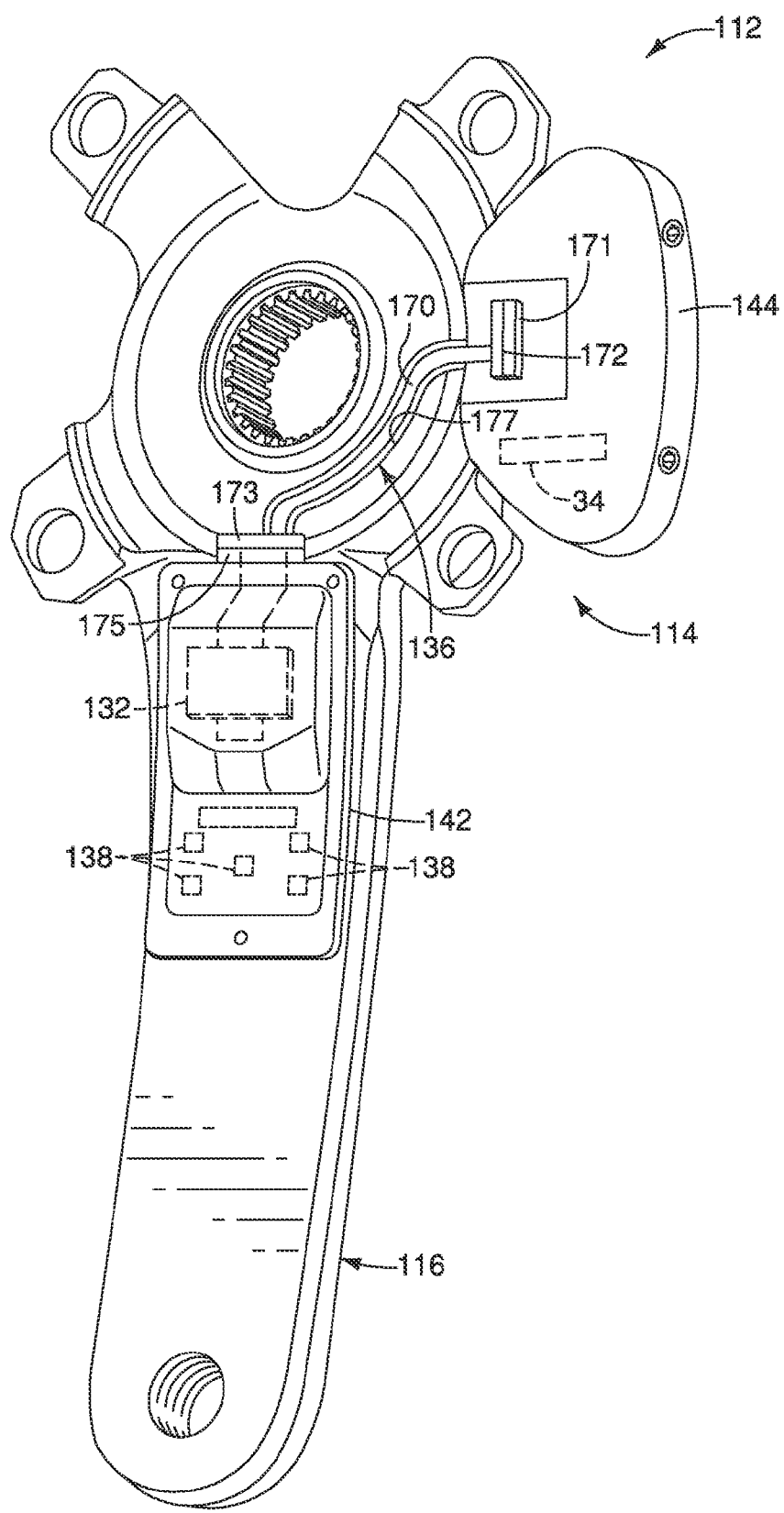
FIG. 20 is an inside perspective view of the right crank arm with the sensor circuit and the wireless communicator of the pedaling tierce detector attached thereto.

Referring now to FIGS. 18 to 20, a bicycle crank assembly 112 is illustrated having a pedaling three detector 114 in accordance with a second embodiment. Basically, the bicycle crank assembly 112 is identical to the bicycle crank assembly 12 of the first embodiment, except that the bicycle crank assembly 112 has been modified for certain mounting parts of the pedaling force detector 114 in different locations and for accommodating a different wiring arrangement of the pedaling force detector 114. Thus, the bicycle crank assembly 112 includes a first crank arm 116, a second crank arm 118 and a crankshaft 120. In view of the similarity between the bicycle crank assembly 112 and the bicycle crank assembly 12 of the first embodiment, the parts of the bicycle crank assembly 112 that are identical in function to the parts of the bicycle crank assembly 12 will be not be discussed for the sake of brevity. Likewise, in view of the similarity between the bicycle pedaling force detector 114 and the bicycle pedaling force detector 14 of the first embodiment, the parts of the bicycle pedaling force detector 114 that are identical in function to the parts of the bicycle pedaling force detector 14 will be not be discussed for the sake of brevity.

In the second embodiment, the bicycle pedaling force detector 114 basically comprises a first sensor circuit 132, a wireless communicator 134, a first electrical connection member 136, a plurality of first strain sensors 138, a second sensor circuit 160, a second electrical connection member 162 and a plurality of second strain sensors 164. The first sensor circuit 132, the wireless communicator 134, the first electrical connection member 136, the first strain sensors 138, the second sensor circuit 160, the second electrical connection member 162 and the second strain sensors 164 are identical to the corresponding parts of the first embodiment, except that the wiring routes and the electrical connectors of the first and second electrical connection members 136 and 162 have been modified.

Similar, the first embodiment, the first sensor circuit 132 and the first strain sensors 138 are fixed to the first crank arm 116 and housed in a first housing 142. The wireless communicator 134 is mounted to the first crank arm 116 by a second housing 144. The first electrical connection member 136 has an electrical wire 170 for electrically connecting the first sensor circuit 132 to the wireless communicator 134. In particular, the second housing 144 has an electrical connector 171 that mates with a first electrical connector 172 of the electrical wire 170. Thus, the first electrical connector 172 of the electrical wire 170 plugs directly into the electrical connector 171 of the second housing 144. The electrical connector 171 is electrically connected to a circuit board of the wireless communicator 134. The other end of the electrical wire 170 has a second electrical connector 173 that mates with an electrical connector 175 of the first housing 142. Thus, the second electrical connector 173 of the electrical wire 170 plugs directly into the electrical connector 175 of the first housing 142. The electrical connector 175 is electrically connected to the first sensor circuit 132, which is electrically connected the first strain sensors 138. The electrical wire 170 is disposed on the outside surface of the crank arm. Preferably, the first crank arm 116 has a recess 177 for receiving the electrical wire 170.

The second electrical connection member 162 includes two electrical wires 184 and 186 that are coupled together by a pair of mating electrical connectors 188 and 190. Here, the electrical connector 188 is mounted on the second crank arm 118 and the electrical connector 190 plugs into the electrical connector 188. With this arrangement, the electrical connector 190 can be easily disconnected from the electrical connector 188. Also the electrical wire 184 mainly runs along an exterior surface of the second crank arm 118. Of course, the exterior surface of the second crank arm 118 can be provided with recesses so that the electrical wire 184 runs completely along the exterior surface of the second crank arm 118.

Figure 21:
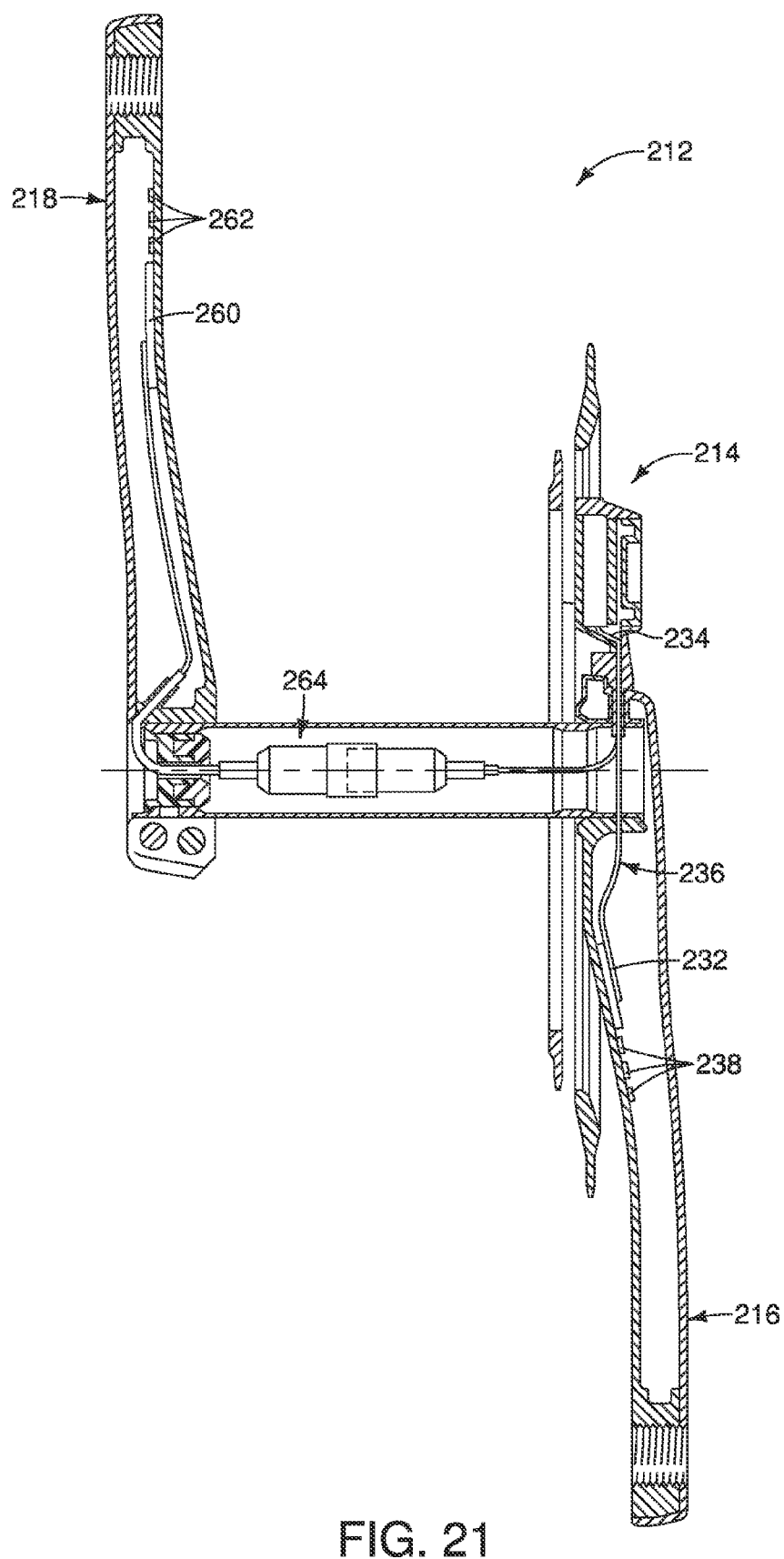
FIG. 21 is a cross sectional view of a bicycle crank assembly with a pedaling force detector in accordance with a third embodiment.

Referring now to FIG. 21, a bicycle crank assembly 212 is illustrated having a pedaling force detector 214 in accordance with a third embodiment. Basically, the bicycle crank assembly 212 is identical to the bicycle crank assembly 12 of the first embodiment, except that the bicycle crank assembly 212 has been modified for mounting certain parts of the pedaling force detector 214 in different locations. Thus, the bicycle crank assembly 212 includes a first crank arm 216, a second crank arm 218 and crankshaft 220. In view of the similarity between the bicycle crank assembly 212 and the bicycle crank assembly 12 of the first embodiment, the parts of the bicycle crank assembly 212 that are identical in function to the parts of the bicycle crank assembly 12 will be not be discussed for the sake of brevity. Likewise, in view of the similarity between the bicycle pedaling force detector 214 and the bicycle pedaling force detector of the first embodiment, the parts of the bicycle pedaling force detector 214 that are identical in function to the parts of the bicycle pedaling force detector 14 will be not be discussed for the sake of brevity.

In the third embodiment, the bicycle pedaling force detector 214 basically comprises a first sensor circuit 232, a wireless communicator 234, a first electrical connection member 236, a plurality of first strain sensors 238, a second sensor circuit 260, a second electrical connection member 262 and a plurality of second strain sensors 264. The first sensor circuit 232, the wireless communicator 234, the first electrical connection member 236, the first strain sensors 238, the second sensor circuit 260, the second electrical connection member 262 and the second strain sensors 264 are identical to the corresponding parts of the first embodiment, except for the mounting locations of the first sensor circuit 232, the first strain sensors 238, the second sensor circuit 260 and the second strain sensors 264. Here, in the third embodiment, the first sensor circuit 232 is configured to be mounted inside of the first crank arm 216. The first strain sensors are fixed to an interior of the first crank arm 216. The first strain sensors 238 are electrically connected to the first sensor circuit 232, in the same manner the first strain sensors 38 and the first sensor circuit 32, as discussed above in the first embodiment. Similarly, the second sensor circuit 260 is configured to be mounted inside of the second crank arm 218. The second strain sensors 264 are fixed to an interior of the second crank arm 218. The second strain sensors 264 are electrically connected to the second sensor circuit 260, in the same manner the second strain sensors 64 and the second sensor circuit 60, as discussed above in the first embodiment.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle crank assembly having the pedaling force detector. Accordingly, these directional terms, as utilized to describe the bicycle crank assembly should be interpreted relative to a bicycle in an upright riding position on a horizontal surface and that is equipped with the bicycle crank assembly. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle pedaling force detector for a bicycle comprising:
   a sensor circuit disposed in a housing that is configured to be mounted to a crank assembly;
   a wireless communicator disposed in a housing that is configured to be detachably mounted to a sprocket mounting portion of the crank assembly, the housing of the wireless communicator being a separate member from the housing of the sensor circuit; and
   an electrical connection member configured to extend through an inside space of the crank assembly and electrically connect the wireless communicator and the sensor circuit.

2. The bicycle pedaling force detector according to claim 1, wherein
   the crank assembly includes a first crank arm.

3. The bicycle pedaling force detector according to claim 2, wherein
   the sensor circuit is configured to be mounted to the crank arm.

4. The bicycle pedaling force detector according to claim 1, wherein
   the housing of the wireless communicator is configured to be disposed offset a longitudinal axis of the crank assembly.

5. The bicycle pedaling force detector according to claim 2, wherein
   the sensor circuit is configured to be mounted outside of the crank arm.

6. The bicycle pedaling force detector according to claim 2, wherein
   the sensor circuit is configured to be mourned inside of the crank arm.

7. The bicycle pedaling force detector according to claim 2, further comprising
   a plurality of strain sensors; and
   the strain sensors are fixed to the crank arm, and are electrically connected to the sensor circuit.

8. The bicycle pedaling force detector according to claim 2, wherein
   the crank arm includes a fixing structure; and
   the housing of the wireless communicator is configured to be detachably attached to the fixing structure.

9. The bicycle pedaling force detector according to claim 2, further comprising
   a plurality of strain sensors; and
   the strain sensors are fixed to an exterior of the crank arm, and are electrically connected to the sensor circuit.

10. The bicycle pedaling force detector according to claim 2, further comprising
    a plurality of strain sensors fixed to an interior of the crank arm, and electrically connected to the sensor circuit.

11. The bicycle pedaling force detector according to claim 2, wherein
    the electrical connection member includes an electrical wire, and
    the crank arm includes a hole with the electrical wire at least partially disposed in the hole.

12. A bicycle pedaling force detector comprising:
    a sensor circuit disposed in a housing that is configured to be mounted to a crank assembly having a first crank arm;
    a wireless communicator disposed in a housing that is configured to be detachably mounted to the crank assembly, the housing of the wireless communicator being a separate member from the housing of the sensor circuit; and
    an electrical connection member configured to extend through an inside space of the crank assembly and electrically connect the wireless communicator and the sensor circuit, the electrical connection member including a first connector and a second connector, the first connector being configured to be mounted on the crank arm, the second connector being mounted on the wireless communicator and being detachably connected to the first connector when the wireless communicator is detachably mounted to the crank arm.

13. The bicycle pedaling force detector according to claim 2, further comprising
    an additional sensor circuit; and
    an additional electrical connection member electrical connecting the wireless communicator and the second sensor circuit;
    the crank assembly further includes an additional crank arm, and a crankshaft connected to the crank arms;
    one of the sensor circuits being fixed to one of the crank arms and the other of the sensor circuits being fixed to the other of the crank arms.

14. The bicycle pedaling force detector according to claim 1, wherein
    the sensor circuit includes an amplifier circuit and a calculation circuit.

15. The bicycle pedaling force detector according to claim 1, wherein
    the sensor circuit is configured to be permanently mounted to the crank assembly.

16. The bicycle pedaling force detector according to claim 1, wherein
    the housing of the wireless communicator further includes a battery receiving structure.

17. The bicycle pedaling force detector according to claim 1, further comprising
    a cadence sensor attached to one of the housing of the sensor circuit and the housing of the wireless communicator.

18. The bicycle pedaling force detector according to claim 17, wherein
the cadence sensor is mounted to the housing of the sensor circuit.

19. The bicycle pedaling force detector according to claim 18, wherein
the cadence sensor is mounted to the housing of the wireless communicator.

20. The bicycle pedaling force detector according to claim 1, wherein
the housing of the wireless communicator is configured to be disposed between a first sprocket mounting arm and a second sprocket mounting arm of the sprocket mounting portion.

21. The bicycle pedaling force detector according to claim 1, wherein
the housing of the wireless communicator and the housing of the sensor circuit are configured to be disposed on opposite sides of an axle receiving hole of the crank assembly.

* * * * *